(12) United States Patent
Dhingra et al.

(10) Patent No.: US 11,055,810 B1
(45) Date of Patent: Jul. 6, 2021

(54) OPTIMIZING GRAPHICS GEOMETRY USING SIMILARITY-BASED CLUSTERING

(71) Applicant: Adobe Inc., San Jose, CA (US)

(72) Inventors: Sumit Dhingra, Delhi (IN); Vineet Batra, Delhi (IN); Praveen Kumar Dhanuka, Uttar Pradesh (IN); Ankit Phogat, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/835,123

(22) Filed: Mar. 30, 2020

(51) Int. Cl.
    *G06T 1/20* (2006.01)
(52) U.S. Cl.
    CPC ..................... *G06T 1/20* (2013.01)
(58) Field of Classification Search
    CPC ... G06T 1/20; G06T 7/20; G06F 17/15; G06F 17/153
    See application file for complete search history.

(56) References Cited

U.S. PATENT DOCUMENTS

| 5,970,173 A | * | 10/1999 | Lee | G06F 17/153 |
| | | | | 345/474 |
| 2020/0211148 A1 | * | 7/2020 | Mackinnon | G06T 11/40 |

* cited by examiner

*Primary Examiner* — Chong Wu
(74) *Attorney, Agent, or Firm* — Keller Jolley Preece

(57) ABSTRACT

A technique is described for clustering graphics objects in a graphic artwork based on affine variance. Geometry data associated with an input set of graphics objects can be processed to identify pairs of graphics objects that are affine variants of each other. The identified affine variants can then be clustered into one or more affine groups. Similar graphics objects in a given affine group can then be represented using a base geometry and a corresponding transformation matrix. Accordingly, the overall geometric complexity of the graphic artwork can be simplified thereby providing various benefits such as reducing file size and improving rendering performance.

20 Claims, 23 Drawing Sheets
(10 of 23 Drawing Sheet(s) Filed in Color)

US 11,055,810 B1

OPTIMIZING GRAPHICS GEOMETRY USING SIMILARITY-BASED CLUSTERING

TECHNICAL FIELD

The disclosed teachings generally relate to the field of computer graphics. The disclosed teachings more particularly relate to a technique for identifying and clustering similar graphics objects to optimize graphics geometry.

BACKGROUND

Certain computer graphics can be defined based on geometric elements. For example, vector graphics are defined based on two-dimensional (2D) points that are connected by lines and curves to form polygons and other shapes. Somewhat similarly, three-dimensional (3D) graphics can be defined based on 3D points in a 3D space that are connected by lines and curves to form polygons and other shapes that together can define a surface and/or volume of a 3D model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

1. Overview

Figure 1:
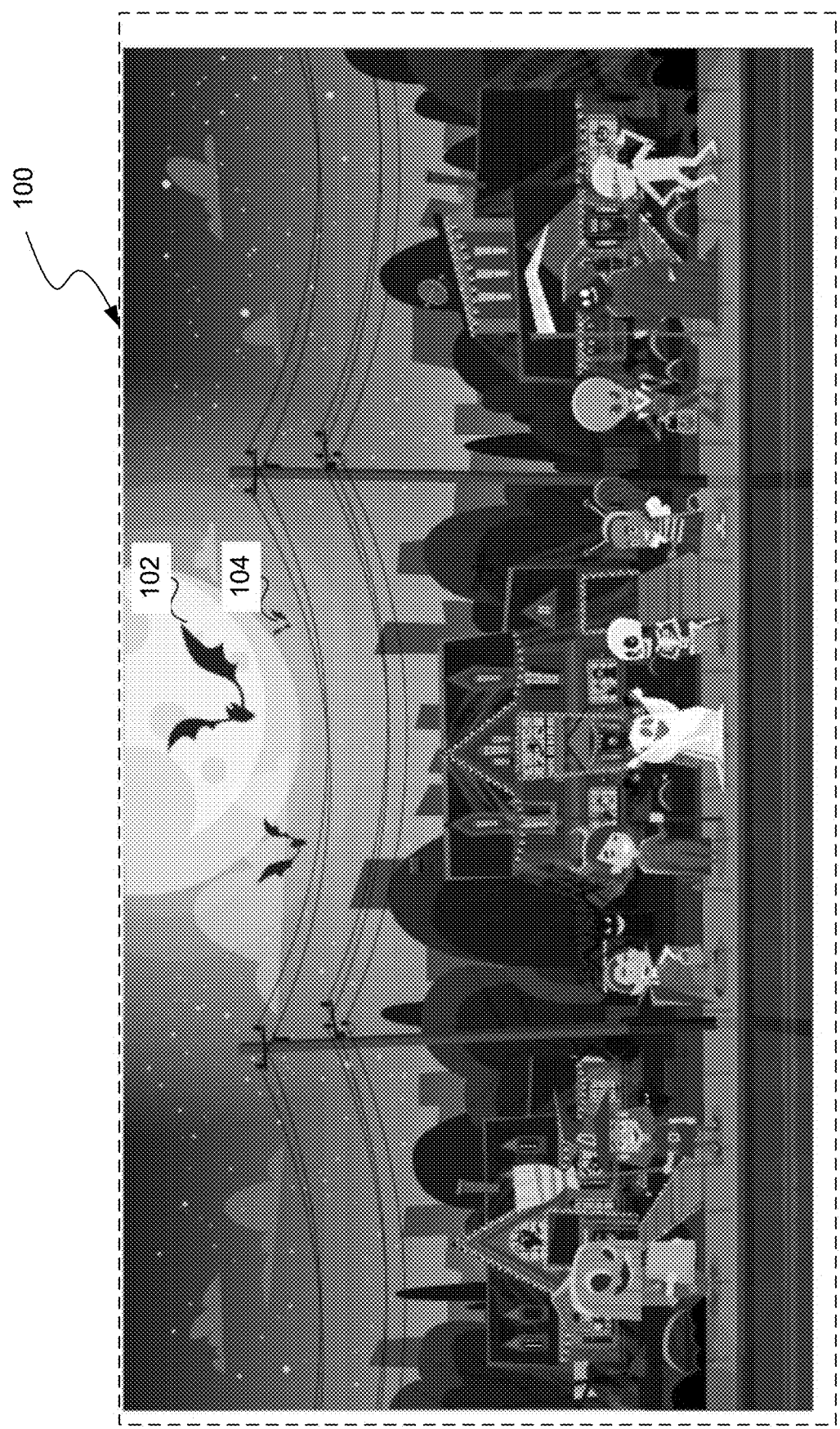
FIG. 1 shows an example vector graphics illustration.

Graphic designers can create rich graphic artwork (e.g., vector graphic illustrations), which can have highly complex geometry. FIG. 1 shows an example vector graphics illustration 100 that can be produced by a graphic designer using a vector graphics application such as Adobe Illustrator™. A vector graphics illustration (e.g., similar to the one depicted in FIG. 1) may have significant redundancy in the included geometric representations due to repeated geometric constructs. Although the repeated constructs are not the exact replicas, they can be affine variants of each other. For example, vector graphic illustration 100 includes objects 102 and 104 that represent bats. In the example, the designer may have copied object 102 and applied various transformations (e.g., scaling, rotating, skewing, etc.) to produce object 104.

A graphic designer will not typically consider computing efficiency when preparing a vector graphics illustration. This is generally due to the fact that graphic design is a creative process as opposed to an optimization exercise. Organization and structuring are often afterthoughts, if considered at all. Still, efficiently handling this complexity is important for both the graphics application and the graphic designer. The inclusion of multiple repeated constructs in a graphic artwork can significantly increase the complexity of the underlying geometry data which can have a detrimental effect on memory usage, rendering performance, asset reuse, and file size. As a result, limited computing resources may be overused, subsequent editing can become difficult, and the overall user experience for the graphic designer can be diminished. The detrimental impact can be particularly pronounced in touch-screen mobile devices and other specialized computing systems (e.g., gaming consoles) that have relatively weak central processing units (CPUs) and strict memory constraints.

Several existing solutions have been developed to try to address the issue of repeated constructs in geometry-based graphics such as vector graphics. For example, Symbols were introduced as a feature in Adobe Illustrator™ to optimize repeating constructs and to encourage reuse, ease of editing, and reducing file size to enhance performance. Adobe Illustrator™ Symbols can generally be understood as vector objects that a user can create from which multiple instances can be defined. In contrast with copying a vector object, adding a symbol instance does not add additional complex geometry to the vector graphics illustration since the instance is linked to and based on the geometry of a symbol. As another example, Global Edit was introduced as another feature of Adobe Illustrator™ which enables users to select an object and identify other objects in a given vector graphics illustration that are similar (i.e., affine variants) to the selected object. While effective to an extent, both the Symbols and Global Edit features are limited in that they require action on the part of the user to realize any benefit. For example, Symbols require a user to take active steps to define an object as a symbol before adding different instances of the symbol. This requires a level of organization and structuring and, as a result, the feature is underutilized. Similarly, Global Edit requires the user to first select an object as a key to identify other objects that are similar to the key. This does not solve the problem of identifying all groups of similar objects in a vector graphics illustration. Moreover, the process for comparing objects to a user-selected key is not performant or scalable enough to be used implicitly (i.e., automatically without user input), due to the sheer computation cost of processing tens of thousands of path objects (comprising hundreds of thousands of cubic Bézier segments) in a real-world vector graphics illustration.

Introduced here, therefore, is a computer-implemented technique for identifying and clustering similar geometric constructs (affine variants) associated with a graphic artwork or other representation (e.g., a vector graphics illustration) that addresses the above-mentioned issues with existing solutions. The introduced technique can identify affine variants of geometric graphics objects and can also compute transformation matrices between the affine variants to reduce overall geometric complexity in a given graphic artwork. Further, the introduced technique can be applied automatically without any user input and can scale effectively to be highly performant on real-world graphics, with computation times within a few hundred milliseconds. In some embodiments, the introduced technique can be implemented in a highly parallel manner by leveraging a programmable general-purpose GPU (GPGPU) pipeline (GPGPU). In an example embodiment, the introduced technique may include the following high-level operations:

Bucketization: In a bucketization operation, graphics objects such as path objects are divided into one or more different buckets based on computed hash values associated with each object. These buckets can help in reducing the overall work to identify affine variants by eliminating unnecessary compression tests.

GPU Set-Up: In a GPU set-up operation, a programmable pipeline of a GPU is orchestrated to execute the introduced technique in a massively parallel fashion. The GPU set-up operation can also transfer geometry data associated with the graphics objects from a central processing unit (CPU) in overlap with the compute pipeline in the GPU.

Similarity Computations: In a similarity comparison operation, pairs of graphics objects are compared to determine if they are affine variants of each other. In an example embodiment, comparisons are performed in parallel using an algorithm that extends and optimizes a Procrustes algorithm, suitable for GPU and graphics objects such as 2D Bézier bounded geometry, to find the correspondence matrix, among all ($\binom{n}{2}$) pairs of graphics objects, in real-time or near-real-time (i.e., within fractions of a second).

Post-Processing: In a post processing operation, the affine similarity matrices can be transferred into the CPU in an asynchronous manner properly exploiting the overlap between compute and the input/output (IO) pipeline. Similar graphics objects (i.e., affine variants) can then be clustered using the correspondence matrix computed using the GPU.

The introduced technique can result in overall improvement in graphical application performance (rendering, serialization, etc.), reduction in file sizes, and can also optimize designer workflows by automatically creating reusable assets for repeated geometries and enabling faster editing. Further, the introduced technique has several advantages over existing techniques. As mentioned above, the introduced techniques is highly performant with runtimes in milliseconds to identify and cluster affine variants of graphics objects. Accordingly, the introduced technique can be executed in the background in real-time or near-real-time (e.g., within milliseconds) while a user is creating and/or editing an artwork and without requiring any explicit user interaction (i.e., without any overt change in the use experience or need for user training). The introduced technique can also be executed in batch mode on groups of graphics files. Further, the introduced technique is platform agnostic since it operates on underlying geometric data. This means that the introduced technique can be implemented in any context (2D or 3D) that involves geometry-based graphics objects including 2D vector graphics and 3D modeling. Accordingly, the introduced technique represents a significant improvement in computer graphics technology in general and vector graphics technology in particular.

For illustrative simplicity, embodiments of the introduced technique are described herein in the context of 2D vector graphics, specifically 2D vector graphics that involve path objects represented using cubic Bézier splines; however, the technique is not to be construed as limited to this context. The introduced technique for identifying similar geometric constructs can also be applied to other types of graphics objects including other types of 2D graphics objects and 3D graphics objects.

2. Technology Environment

Figure 2:
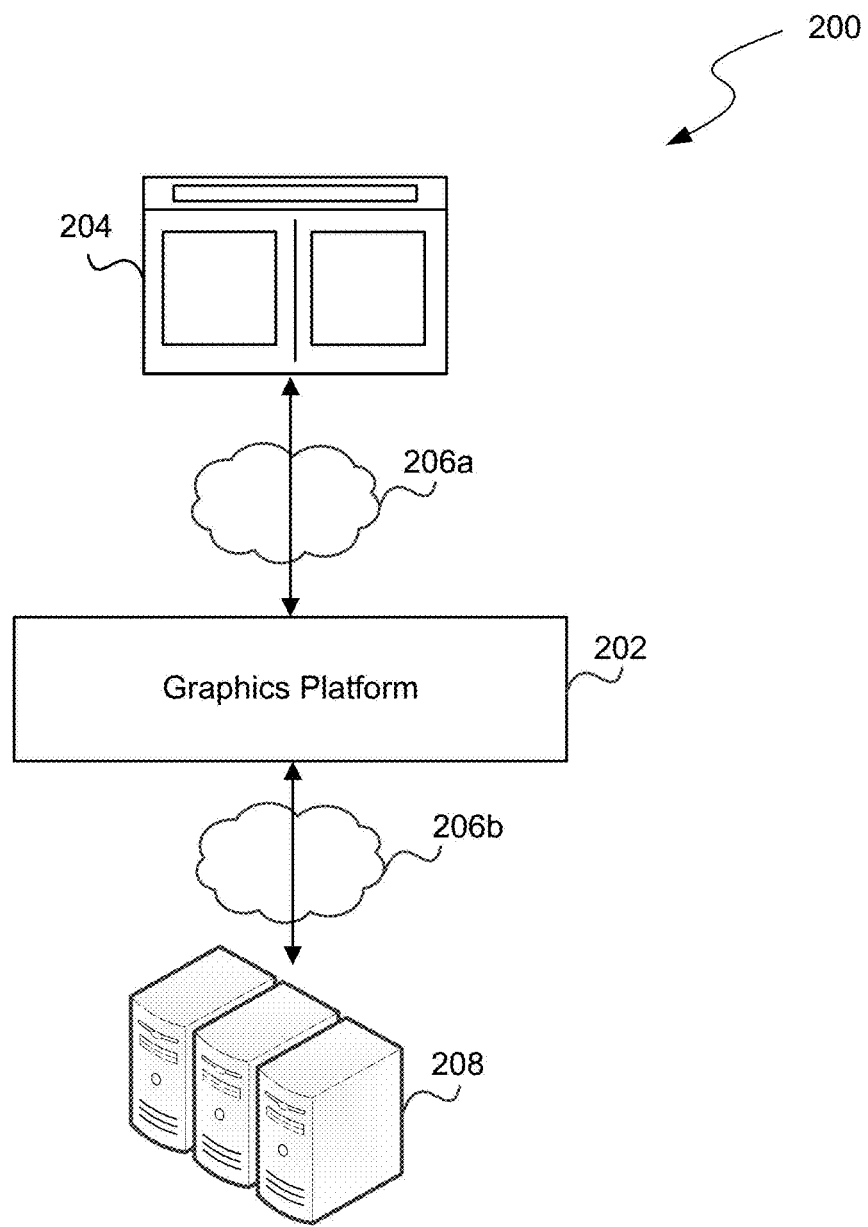
FIG. 2 shows a block diagram of an example computing environment that includes a graphics platform.

FIG. 2 shows a block diagram of an example computing environment 200 that includes a graphics platform 202. A user (e.g., a graphic designer) can interface with the graphics platform 202 via an interface 204 to access various functionalities provided by the graphics platform 202.

The graphics platform 202 may be connected to one or more networks 206a-b. The network(s) 206a-b can include local area networks (LANs), wide area networks (WANs), metropolitan area networks (MANs), cellular networks, the Internet, etc. The graphics platform 202 may also communicate with other computing devices over a short-range communication protocol, such as Bluetooth® or Near Field Communication (NFC).

A user can access various functionalities provided by the graphics platform 202 via interface 204. In some embodiments, interface 204 may include a graphical user interface (GUI) through which visual outputs are displayed to a user and inputs are received from the user. The interface 204 may be accessible via one or more of a web browser, a desktop software program, a mobile application, an over-the-top (OTT) application, or any other type of application configured to present an interface to a user. Accordingly, the interface 204 may be accessed by the user on a user computing device such as a personal computer, mobile phone (e.g., Apple iPhone™), tablet computer (e.g., Apple iPad™) personal digital assistant (PDA), game console (e.g., Sony PlayStation™ or Microsoft Xbox™), music player (e.g., Apple iPod Touch™), wearable electronic device (e.g., Apple Watch™), network-connected ("smart") device (e.g., a television or home assistant device), virtual/augmented reality system (e.g., a head-mounted display such as Oculus Rift® and Microsoft HoloLens), or some other electronic device.

In some embodiments, the graphics platform 202 is hosted locally. That is, one or more of the computer programs associated with the graphics platform 202 may reside on the computing device used to access the interface 204. For example, the graphics platform 202 may be embodied as a graphics application (e.g., Adobe Illustrator™) executing on a user's personal computer. In some embodiments, one or more components of the graphics platform 202 may be executed by a cloud computing service, for example, operated by Amazon Web Service™ (AWS), Google Cloud Platform™, Microsoft Azure™, or a similar technology. In such embodiments, some components of the graphics platform 202 may reside on a host computer server that is communicatively coupled to one or more content computer servers 208. The content computer server(s) 208 can include different types of data, user information (e.g., profiles, credentials, etc.), and other assets. Additionally, or alternatively, such information could be stored on the host computer server. In some embodiments, one portion of the graphics platform 202 may be hosted locally while another portion is hosted remotely (e.g., at a cloud computing service). For example, the graphics platform 202 may comprise a cloud-based graphics service (e.g., Adobe Creative Cloud™) to which a user can subscribe to download a graphics application (e.g., Adobe Illustrator™) which is then executed locally at the user's computing device. In such an embodiment, although executing locally at the user's computer, the graphics application may communicate with remote components of the graphics platform, for example to communicate software license information. The local and remote portions of the graphics platform 202 may communicate with each other via the one or more networks 206a-b. Certain embodiments are described in the context of network-accessible interfaces. However, those skilled in the art will recognize that the interfaces need not necessarily be accessible via a network. For example, a user computing device may be configured to execute a self-contained software program that does not require network access.

The graphics platform 202 may be configured to enable users to create, edit, render, and display one or more computer graphics types such as 2D vector graphics. In some embodiments, the graphics platform 202 comprises a single graphics application (e.g., Adobe Illustrator™) configured to enable user to create, edit, render, and display one (or a limited set) of types of graphics (e.g., 2D vector graphics). In other embodiments, the graphics platform 202 may comprise multiple graphics applications each configured to handle a different type of graphics (e.g., 2D vector graphics and 3D graphics).

Figure 3:
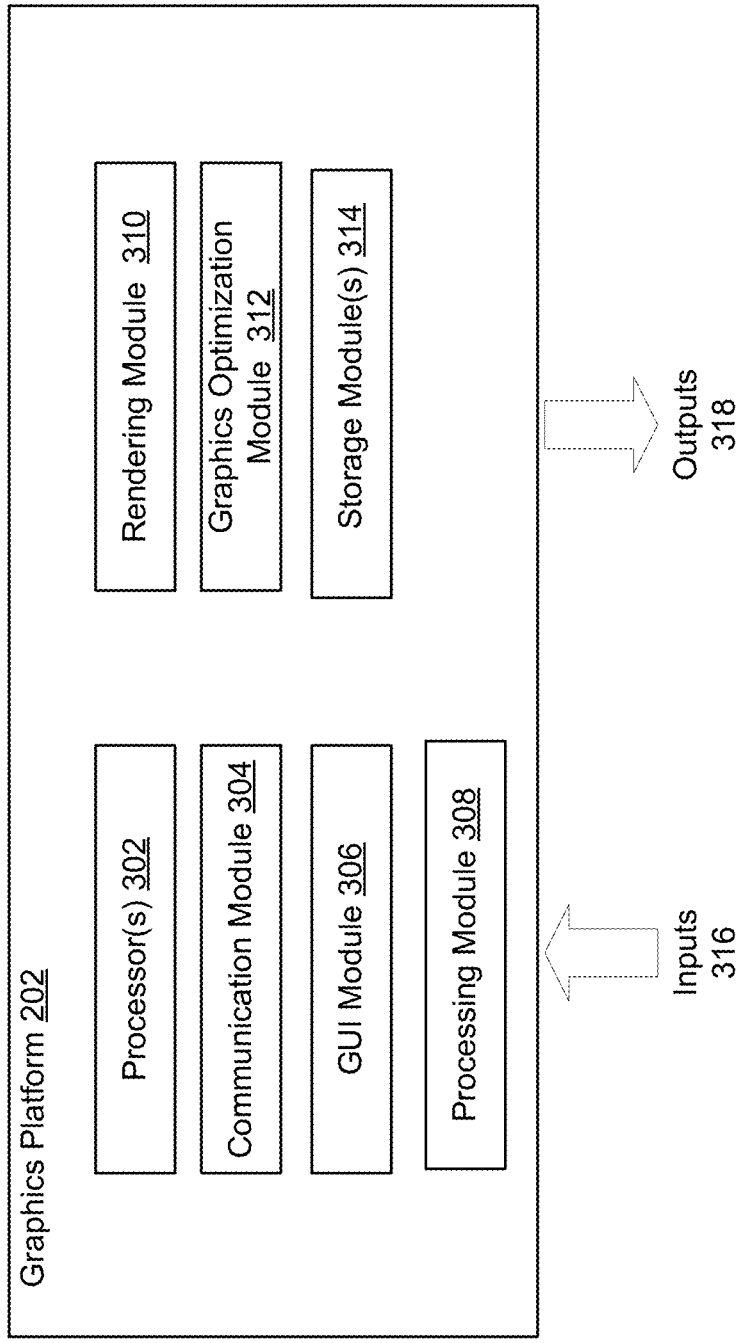
FIG. 3 shows a block diagram of a high-level architecture of the graphics platform of FIG. 2.

FIG. 3 shows a block diagram of a high-level architecture of an example graphics platform 202. The example graphics platform 202 can include one or more processors 302, a communication module 304, a GUI module 306, a processing module 308, a rendering module 310, a graphics optimization module 312, and one or more storage modules 314. In some embodiments, a single storage module includes multiple computer programs for performing different operations (e.g., format conversion, graphics optimization, rendering), while in other embodiments, each computer program is hosted within a separate storage module. Embodiments of the graphics platform 202 may include some or all of these components as well as other components not shown here.

The processor(s) 302 can execute modules (e.g., the processing module 308 and the graphics optimization module 312) from instructions stored in the storage module(s) 314, which can be any device or mechanism capable of storing information. The communication module 304 can manage communications between various components of the graphics platform 202. The communication module 304 can also manage communications between the computing device on which the graphics platform 202 resides and another computing device such as a user computing device (if separate).

For example, the graphics platform 202 may reside on user computing device in the form of a graphics application (e.g., Adobe Illustrator™). In such embodiments, the communication module 304 can facilitate communication with a network-accessible computer server responsible for supporting the graphics application (e.g., a software license server). The communication module 304 may facilitate communication with various data sources through the use of application programming interfaces (APIs), bulk data interfaces, etc.

As another example, the graphics platform 202 may reside on a server system that includes one or more network-accessible computer servers. In such embodiments, the communication module 304 can communicate with a software program executing on a user computing device to, for example, optimize a graphics file stored at the user computing device. Those skilled in the art will recognize that the components of the graphics platform 202 can be distributed between the server system and the computing device associated with the individual in various manners. For example, some data may reside on the computing device of a user, while other data may reside on the server system.

The GUI module 306 can generate GUIs through which the user can interact with the graphics platform 202 to, for example, create, edit, or view computer graphics. For example, a GUI associated with the graphics platform 202 may present an editing GUI through which a user can define graphics objects (e.g., path objects) in an artwork (e.g., a vector graphics illustration), edit the graphical elements, and save the graphical elements associated with the artwork in a graphics file. In some embodiments, the GUI presented by the GUI module 306 may further enable the user to generate renderings of the artwork, print the artwork, share the artwork with other users, etc.

The processing module 308 can apply one or more operations to input data 316 acquired by the graphics platform 202 to provide certain functionalities described herein. Input data may include geometry data associated with 2D or 3D graphical elements. In some embodiments, geometry data may be input from a graphics fie (e.g., an Adobe Illustrator™ ".ai" file). Input data 316 may additionally include user input commands that are received, for example, via interface 204 to edit graphical elements that are defined in an input graphics file, render the graphical elements, etc.

A rendering module 310 may, in conjunction with the processing module 308, process input data 316 (e.g., geometry data defined in a graphics file) to render a 2D image based on the input data 316 that can be displayed to a user, for example, via interface 204. In some embodiments, the rendering module 310 and graphics optimization module 312 may be combined as a single graphics module.

Figure 4:
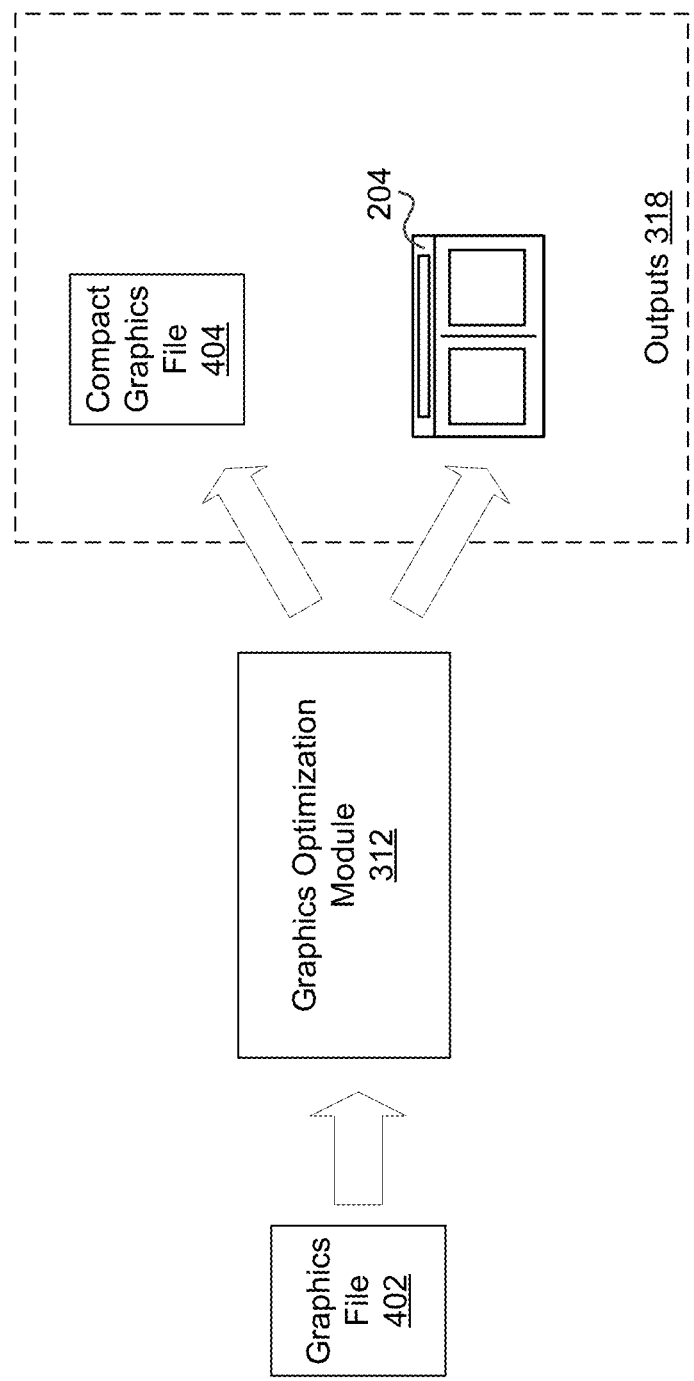
FIG. 4 shows a flow diagram that illustrates the operation of a graphics optimization module of the graphics platform of FIG. 2.

The graphics optimization module 312 may, in conjunction with the processing module 308, process input geometry data 316 to perform one or more operations associated with the introduced technique. For example, as shown in FIG. 4, the graphics optimization module may receive, retrieve, or otherwise access geometry data associated with one or more graphics objects that are defined in a graphics file 402. The graphics optimization module 312 can process the geometry data to identify and cluster similar graphics objects (i.e., affine variants) and can generate one or more outputs 318 based on the processing. In this context, the generated outputs may include, for example, a compact or compressed graphics file 404 in which similar graphics objects are instead represented by transformation matrices associated with a common base geometry. The generated outputs 318 may also include efficient renders of the graphics file 402 (or compact graphics file 404) presented via the interface 204. The generated outputs 318 may also include various UI elements based on the identified similar graphics objects. For example, in response to a user selecting a particular graphics object, the graphics optimization module 312 may highlight all the affine variants of the selected graphics object. As another example, interface 204 may present various interactive elements through which a user can edit all the affine variants of a selected graphics object by editing the selected graphics object. These are just examples of some of the outputs 318 that can be generated using the introduced technique.

3. Graphics Objects

The introduced technique can be applied to process geometry data associated with various types of graphics objects to identify and cluster affine variants. A "graphics object" in this context may refer to any type of geometric model or construct that can be applied in a computing system to render a visual element for display to an individual. A graphics object may be associated with geometry data that is defined in a graphics file. Examples of graphics objects include 2D graphics objects (e.g., 2D vector graphics objects) and/or 3D graphics objects (e.g., 3D wireframe objects, 3D surface objects, and 3D solid objects).

Figure 5:
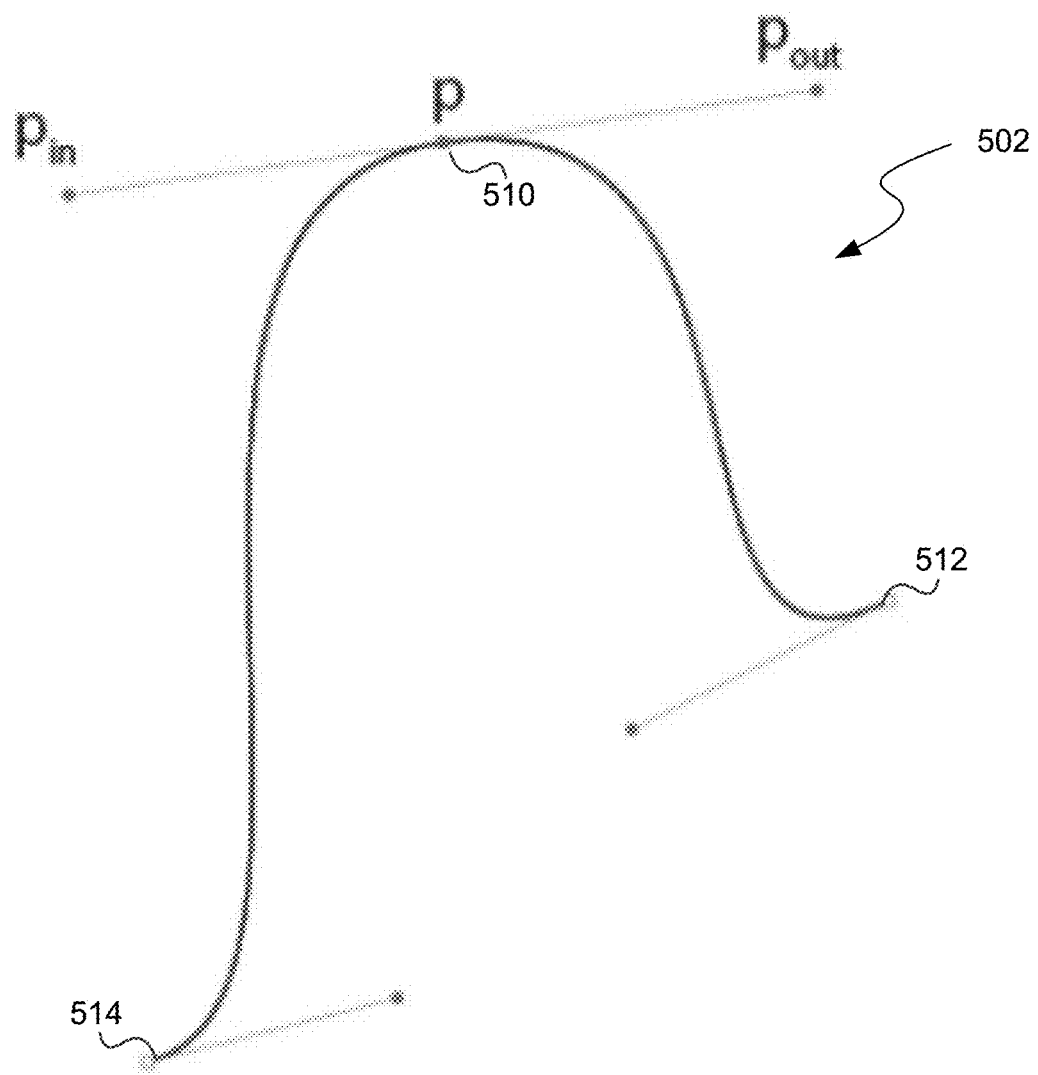
FIG. 5 shows an example graphics object in the form of a cubic Bézier curve with three anchor points.

In an illustrative embodiment, a graphics object includes a path object that is represented using a cubic Bézier spline with N anchor points. Such a graphics object is common in many vector graphics applications such as Adobe Illustrator™. FIG. 5 shows an example cubic Bézier curve 502 with three anchor points 510, 512, and 514. In some embodiments, each anchor point is represented by three points ($p_{in}$, $p$, $p_{out}$); however other embodiments may represent anchor points with more or fewer than three points. Here, $p_{in}$ is the "in" handle at anchor point 510, and $p_{out}$ is the "out" handle at anchor point 510. The path object 502 can be presented in matrix form as follows:

$$P = \begin{bmatrix} x_i & y_i \\ p_{in0x} & p_{in0y} \\ p_{0x} & p_{0y} \\ p_{out0x} & p_{out0y} \\ \vdots & \vdots \\ p_{in(N-1)x} & p_{in(N-1)y} \\ p_{(N-1)x} & p_{(N-1)y} \\ p_{out(N-1)x} & p_{out(N-1)y} \end{bmatrix} \quad (1)$$

As shown above, column 0 and column 1 in matrix P are represented as x and $y_i$, respectively, henceforth.

The graphics object illustrated in FIG. 5 and described in matrix P is provided for illustrative purposes. Other embodiments may be applied to identify affine variance in other types of graphics objects including other types of 2D objects and 3D graphics objects.

4. Identifying and Clustering Similar Path Objects

The following Subsections 4.1-4.4 describe an embodiment of the introduced technique for identifying and clustering similar graphics objects. For illustrative simplicity, the following Subsections 4.1-4.4 are described in the context of a graphics object in the form of a 2D path object such as the cubic Bézier (e.g., as described in Section 3 above). For this reason, certain provided equations may be limited to use with 2D geometry. A person having ordinary skill in the art will recognize that the introduced technique can be extended to use with 3D geometry by modifying the provided equations to add a third spatial dimension.

4.1 Bucketization

In some embodiments, an initial bucketization operation is performed to divide multiple path objects into different buckets based on an initial analysis of their similarities. The bucketization operation may apply a low-cost analysis (e.g., based on hash values) to initial cluster path objects that are more likely to be affine variants of each other. In other words, the bucketization operation may be applied to prevent unnecessary comparison of path objects that are not likely to be affine variants of each other. This can reduce processing time, particularly in real-world graphics involving thousands of path objects.

Figure 6:
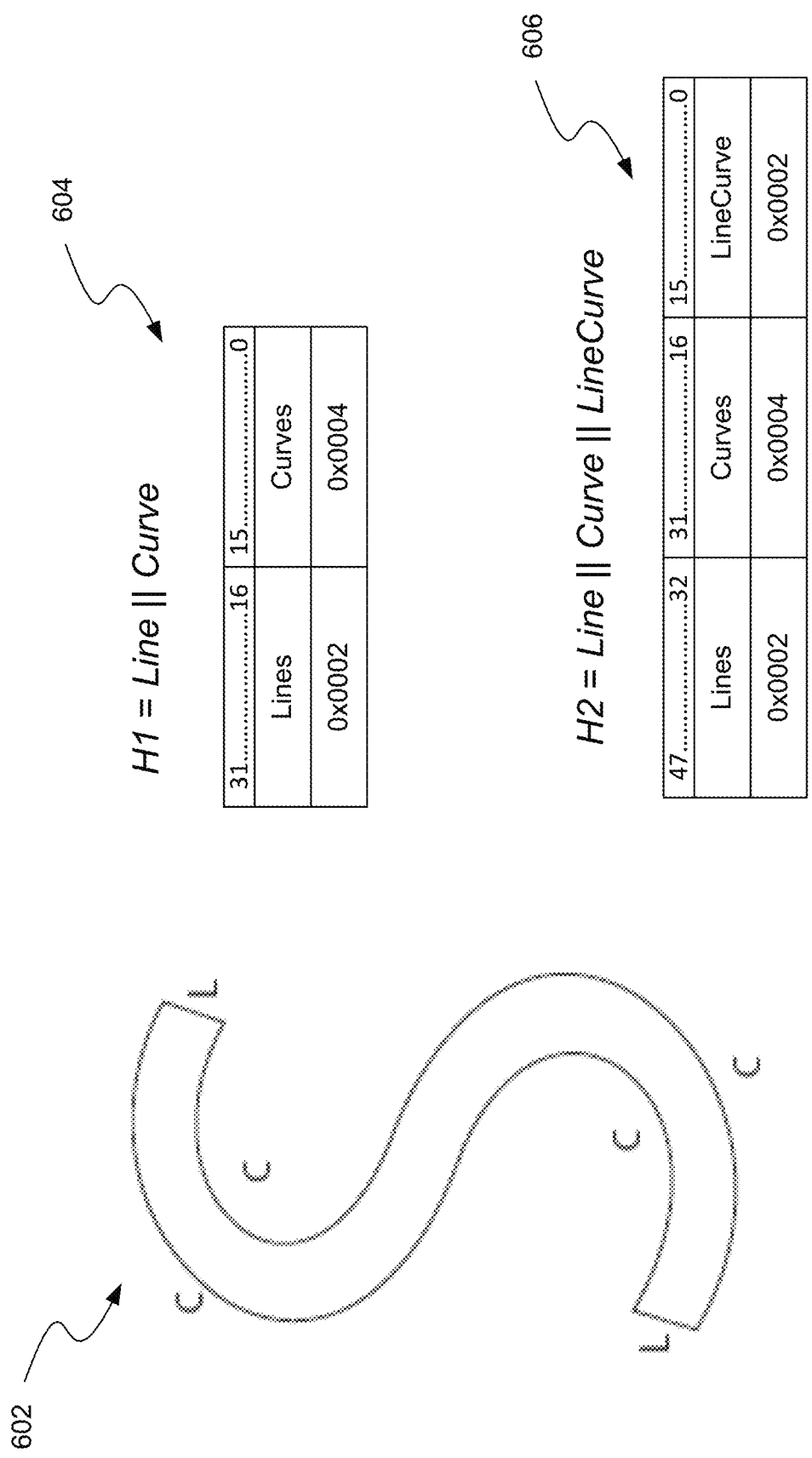
FIG. 6 shows an example Bézier path object and associated hash values that can be used to perform a bucketization operation.

In an example embodiment, the bucketization operation is performed by generating a hash value for each of the multiple path objects associated with a graphical artwork. The manner in which the hash values are generated may differ in various embodiments but should be indicative of some aspect of the geometry of the path object. In an example embodiment, the hash values are generated based on a quantity of line and/or curve primitives in a Bézier path object. FIG. 6 shows an example Bézier path object 602. In such an embodiment, the hash value for path object 602 may be generated as H1=Line||Curve where Line indicates a quantity of line primitives in the path object 602 and Curve indicates a quantity of curve primitives in the path object 602. For example, as shown in FIG. 6, hash value 604 for path object 602 is based on a quantity of line primitives in the path object 602 (in this case 2) and a quantity of curve primitives in the path object 602 (in this case 4). These values can be concatenated to produce a final hash value H1. In an example embodiment, the size of H1 is set to 4 bytes where most significant 16 bits represent the quantity of line primitives and the least significant 16 bits represent the quantity of curve primitives. Note, the hash value H1 is agnostic to any circular rotation of the points, translation of the points, and/or scaling or other transformation of the points.

The hash value 604 (i.e., H1) is just an example provided for illustrative purposes. Other types of hash calculations can be applied using a similar concept. For example, hash value 606 represents a higher order hash value that additionally considers the quantity of instances in which a line primitive is adjacent to a curve primitive. Specifically, hash value 606 may be generated as H2=Line||Curve||LineCurve where LineCurve indicates a quantity of instances in which a line primitive is adjacent to a curve primitive in a Bézier path. As with H1 these values can be concatenated to produce a final hash value H2. In an example embodiment, the size of H2 is set to 6 bytes where most significant 16 bits represent the quantity of line primitives, the next significant 16 bits represent the quantity of curve primitives, and the least significant 16 bits represent the quantity of instances where a line primitive is adjacent to a curve primitive.

In some embodiments, the type of hash value applied may depend on the quantity of path objects that are to be placed into buckets. For example, hash value H1 may be applied when there are relatively few path objects while hash value H2 may be applied when there are relatively many path objects or vice versa. The trade-off associated with calculating and comparing higher order hash values such as H2 may be considered as part of the bucketization process. For example, an embodiment of the introduced technique may include determining a quantity of path objects and applying a first hash calculation (e.g., H1=Line||Curve) in response to determining that the quantity of path objects is less than or equal to a specified threshold quantity of path objects or applying a second hash calculation (e.g., H2=Line||Curve||LineCurve) in response to determining that the quantity of path objects exceeds the threshold quantity of path objects.

In some embodiments, the bucketization operation may be performed iteratively and the type of value applied may change based on the results of an iteration. For example, a first iteration may use a first hash calculation (e.g., H1=Line||Curve) to produce a first set of buckets. If the quantity of buckets in the first set of buckets does not satisfy a specified bucketization criterion (e.g., exceed a threshold quantity of buckets), the bucketization operation may be performed again using a second hash calculation (e.g., H2=Line||Curve||LineCurve).

The bucketization operation can be immensely efficient in eliminating false candidates with minimal processing. Once potential candidates are grouped together into buckets, the overall process can proceed by iterating over all the buckets to path objects using a GPU to identify all the affine variants in a given artwork. That being said, bucketization may not be required in all embodiments of the introduced technique. For example, in some embodiments the quantity of path objects may be so small that the costs associated with performing the bucketization operation do not outweigh any potential performance gains during the similarity comparison operation. In some embodiments, the introduced technique may include determining a quantity of path objects and only performing the bucketization operation in response to determining that the quantity of path objects exceeds a specified threshold quantity of path objects.

4.2 GPU Set-Up

A bucketization operation may produce a multiple mutually exclusive buckets of path objects. That is, a particular path object will belong to only one of the multiple buckets produced during the bucketization operation. This enables the path objects to be compared within a given bucket instead of across an entire input set. Still, the quantity of path objects in each bucket may still be relatively large (e.g., in the hundreds or thousands) making the similarity computations prohibitively expensive on a CPU. In order to overcome this, the introduced technique can leverage the single instruction, multiple data (SIMD) model of a GPU pipeline in an efficient manner. In an example embodiment, path geometry for an entire artwork is copied from CPU memory to GPU memory. Here, the introduced technique may rely on the disjoint nature of buckets to overlap data transfer of the $k_{th}$ bucket with similarity computations performed on the $(k-1)_{th}$ bucket. In other words, geometry data associated with a second set of path objects in a second bucket may be transferred from CPU memory to GPU memory as similarity computations are being performed by the GPU on geometry data associated with a first set of path objects in a first bucket.

In some embodiments, similarity computations may be performed, at least in part, at the CPU based on a quantity of path objects in a given bucket. For example, to free up the GPU to process buckets with a higher quantity of path objects, the introduced technique may cause the similarity computations for buckets with a lower quantity of path objects to be performed using the CPU. In an example embodiment, the introduced technique may include determining a quantity of path objects in a particular bucket and processing the geometry data associated with the path objects in the particular bucket using a CPU instead of a GPU to identify and cluster affine variants in response to determining that the quantity of path objects in the particular bucket is below a threshold quantity of path objects. The threshold may be set to any value and may be user specified and/or calculated automatically based on memory capacity, processor capacity, etc. For example, the threshold may dynamically change in real time based on monitored processing capacity of a GPU. In such an embodiment, the threshold may increase as the processing capacity at the GPU decreases in order to offload more processing to the CPU. In some embodiments, the threshold may be set based on a size of a thread block implemented at the GPU (e.g., 16 in the examples described below).

4.3 Similarity Computation

The objective of the similarity computation is to further cluster path objects in a given bucket based affine variance. In other words, all the path objects in a particular cluster within a bucket will be affine variants of each other where the components of affine transformation include translation, scaling and rotation. The subsequent subsections describe example techniques for determining each of these components.

Figure 7:
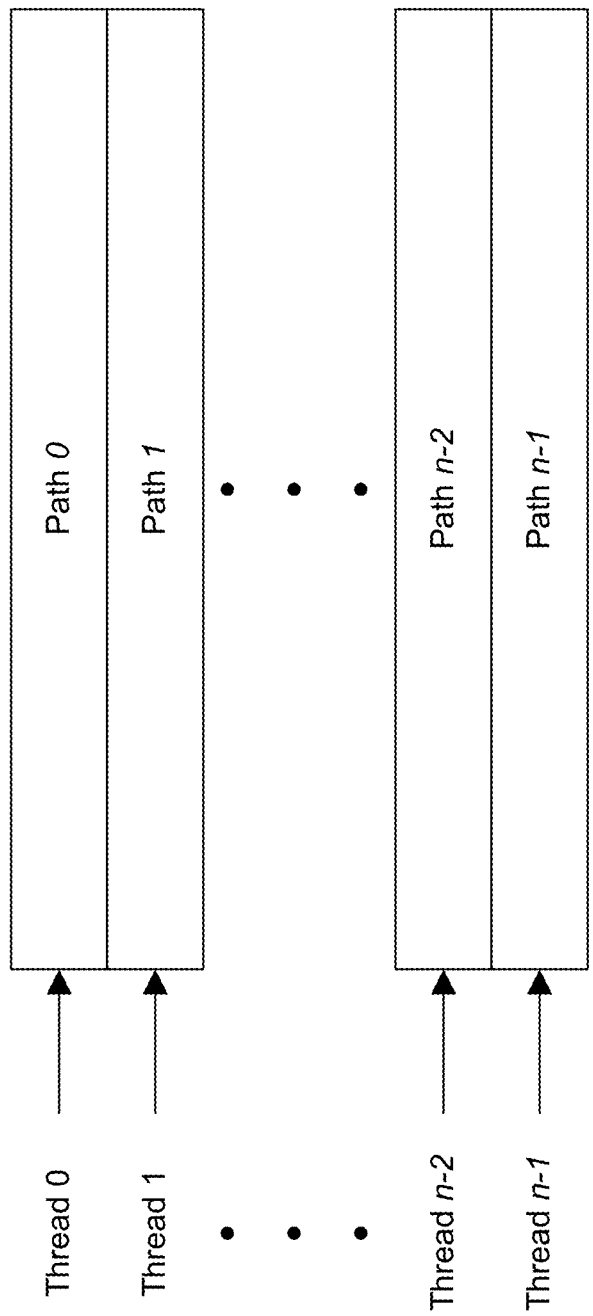
FIG. 7 shows a block diagram illustrating the parallel processing of multiple graphics objects using multiple threads.

In an example embodiment (e.g., in a bucket consisting of $n$ path objects), the path objects are first normalized to determine the translation and scale components before determining the rotation components. A GPU SIMD architecture can be used to perform the translation and scaling normalization for each of the $n$ path objects in parallel, for example, as shown in FIG. 7. As shown in FIG. 7, each of the $n$ path objects are processed using a different one of the $n$ threads according to the GPU SIMD architecture. The centroid and scale 1D matrices are copied back from GPU to CPU to construct a transformation matrix along with a rotation matrix.

4.3.1 Determining Translation

In an example embodiment, the centroid for all the path objects in a bucket is determined to then determine the translation component of each path object by treating the centroid as an origin.

$$\overline{P}_{centroidX} = \frac{\sum_{i=0}^{3N-1} x_i}{3N},$$

$$\overline{P}_{centroidY} = \frac{\sum_{i=0}^{3N-1} y_i}{3N}$$

where $x_i$, $y_i$ represent column 0 and 1, respectively, of matrix P from equation (1) and N represents quantity of anchor points.

Next, the points in each of the path objects can be translated so that their mean is translated to the origin. $(x_i, y_i) \rightarrow (x_i - \overline{P}_{centroidX}, y_i - \overline{P}_{centroidY})$ giving the points $(x_0 - \overline{P}_{centroidX}, y_0 - \overline{P}_{centroidY}), \ldots$ 4.3.2 Determining Scale In an example embodiment, each of the path objects is further normalized so that the root mean square distance from the points of each path object to the translated origin is 1.

$$s = \sqrt{\frac{\sum_{i=0}^{3N-1}\left((x_i - \overline{P}_{centroidX})^2 + (y_i - \overline{P}_{centroidY})^2\right)}{3N}}$$

where $x_i$, $y_i$ represent column 0 and 1, respectively, of matrix P from equation (1) and N represents the quantity of anchor points.

The scale becomes 1 when the point coordinates are divided by the path object's scale $_s$. The normalized factor $_s$ is the scaling component of the corresponding path object.

4.3.3 Determining Rotation

Once the path objects are normalized with respect to scale and translation, a rotation component between each unique pair of path objects is determined. To determine the rotation component between two path objects, one of the two path objects is selected as a reference orientation. The orientation of the reference path object is fixed, and the other path object is rotated about the origin until an optimal rotation angle θ is found, such that the sum of the squared distances between the corresponding points is minimized.

Consider, for example, two path objects with points $(x_i, y_i)$ and $(w_i, z_i)$ (respectively). Each of the two path objects has N anchor points and thus belong to same bucket. Then optimal rotation angle θ of $(x_i, y_i)$ w.r.t $(w_i, z_i)$ can be calculated using 2D Procrustes analysis as:

$$\theta = \tan^{-1}\left(\frac{\sum_{i=0}^{3N-1}(w_i y_i - z_i x_i)}{\sum_{i=0}^{3N-1}(w_i x_i + z_i y_i)}\right) \quad (2)$$

In a real-world example, each input path may have hundreds of segments. Determining the rotation angle between the two paths using equation (2) (i.e., based on all the points in each path) may become computationally expensive. However, since the objective is to identify affine variants, an optimization can be applied to instead use only a single point from each path object to determine the rotation angle. Using such an optimization, equation (2) can be effectively reduced to the following:

$$\theta = \tan^{-1}\left(\frac{w_0 y_0 - z_0 x_0}{w_0 x_0 + z_0 y_0}\right) \quad (3)$$

For path objects that are not affine variants of each other, the optimal rotation angle θ determined based on equation (3) will result in large value of for the Procrustes distance. Determining the rotation angle based on a single point can provide a significant performance benefit in the GPU as the need for serialized calculations (i.e., for each point) is eliminated.

The following is a proof of the proposed optimized equation (3) for determining the optimal rotation angle θ:

Proof: Using θ from equation (2), calculate new points $(u_i, v_i)$ w.r.t $(w_i, z_i)$, $$\begin{bmatrix} u_i \\ v_i \end{bmatrix} = \begin{bmatrix} \cos\theta & -\sin\theta \\ \sin\theta & \cos\theta \end{bmatrix} * \begin{bmatrix} w_i \\ z_i \end{bmatrix}$$

Let, $$x_i = u_i + \Delta e_{xi}$$

$$y_i = v_i + \Delta e_{yi}$$

insert $x_i$, $y_i$ into equation (2) and replace θ from equation (3), $$\tan^{-1}\left(\frac{w_0 y_0 - z_0 x_0}{w_0 x_0 + z_0 y_0}\right) = \tan^{-1}\left(\frac{\sum_{i=0}^{3N-1}(w_i(v_i + \Delta e_{yi}) - z_i(u_i + \Delta e_{xi}))}{\sum_{i=0}^{3N-1}(w_i(u_i + \Delta e_{xi}) + z_i(v_i + \Delta e_{yi}))}\right)$$

resolving, $$\tan^{-1}\left(\frac{w_0 y_0 - z_0 x_0}{w_0 x_0 + z_0 y_0}\right) = \tan^{-1}\left(\frac{\sum_{i=0}^{3N-1}(w_i^2 \sin\theta + z_i^2 \sin\theta + w_i \Delta e_{yi} - z_i \Delta e_{xi})}{\sum_{i=0}^{3N-1}(w_i^2 \cos\theta + z_i^2 \cos\theta + w_i \Delta e_{xi} - z_i \Delta e_{yi})}\right)$$

insert $x_0$, $y_0$ into L.H.S and resolve, $$\tan^{-1}\left(\frac{w_0^2 \sin\theta + z_0^2 \sin\theta + w_0 \Delta e_{y0} - z_0 \Delta e_{x0}}{w_0^2 \cos\theta + z_0^2 \cos\theta + w_0 \Delta e_{x0} - z_0 \Delta e_{y0}}\right) =$$

$$\tan^{-1}\left(\frac{\sum_{i=0}^{3N-1}(w_i^2 \sin\theta + z_i^2 \sin\theta + w_i \Delta e_{yi} - z_i \Delta e_{xi})}{\sum_{i=0}^{3N-1}(w_i^2 \cos\theta + z_i^2 \cos\theta + w_i \Delta e_{xi} - z_i \Delta e_{yi})}\right)$$

If the two paths are identical and θ is correctly determined then $\Delta e_{xi}$ and $\Delta e_{yi}$ will be $\approx 0$. Thus, the equation reduces down to $$\tan^{-1}\left(\frac{w_0^2 \sin\theta + z_0^2 \sin\theta}{w_0^2 \cos\theta + z_0^2 \cos\theta}\right) = \tan^{-1}\left(\frac{\sum_{i=0}^{3N-1}(w_i^2 \sin\theta + z_i^2 \sin\theta)}{\sum_{i=0}^{3N-1}(w_i^2 \cos\theta + z_i^2 \cos\theta)}\right)$$

$$\tan^{-1}\left(\tan\theta \frac{(w_0^2 + z_0^2)}{(w_0^2 + z_0^2)}\right) = \tan^{-1}\left(\tan\theta \frac{\sum_{i=0}^{3N-1}(w_i^2 + z_i^2)}{\sum_{i=0}^{3N-1}(w_i^2 + z_i^2)}\right)$$

$$\theta = \theta$$

Once θ is determined, the next step is to determine the Procrustes distance as a statistical measure of difference in shape. The two path objects are considered affine variants of each other if the resulting Procrustes distance (shown at equation (4) below) is less than a specified threshold.

$$d = \sqrt{\sum((u_i - x_i)^2 + (v_i - y_i)^2)} \text{ where} \qquad (4)$$
$$(u_i, v_i) = (\cos\theta w_i - \sin\theta z_i, \sin\theta w_i + \cos\theta z_i)$$

Figure 8:
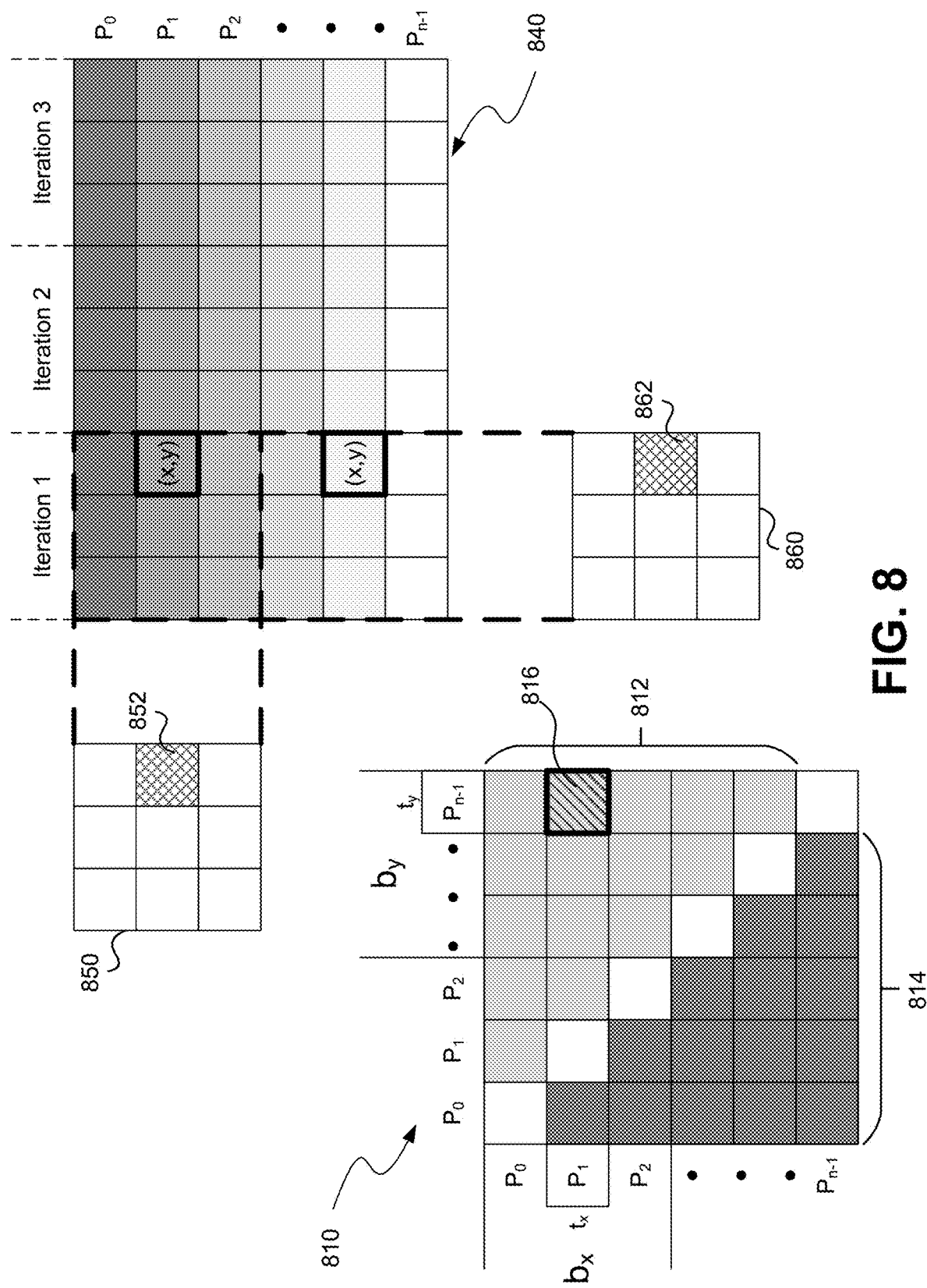
FIG. 8 shows an example 2D output grid that can be used to store the results of similarity computations based on multiple graphics objects.

In some embodiments, the introduced technique may include determining a rotation component of an affine-transformation matrix for each unique pair of path objects in a given input set of path objects. Accordingly, the output data based on these determinations can be arranged in a 2D grid fashion. For example, FIG. 8 shows an example 2D output grid 810 that can be used to store the outputs (e.g., rotation components) based on the similarity computations for path objects $P_0$ through $P_{n-1}$. When performing the computations using a GPU, one processing thread can be used for each entry in the resulting 2D output grid. Thus, an input set of $_n$ path objects will use $_{n^2}$ threads. A "thread" in this context refers to a unit of data processing. A person having ordinary skill in the art will recognize that multiple threads can be executed in parallel in a processor such as a GPU. The threads can be organized into groups referred to as thread blocks. In some embodiments, the thread blocks may be organized as 2D thread blocks. The dimensions of the 2D thread blocks may be limited by the architecture of the GPU, but in some embodiments, the thread blocks are organized as 16×16 2D thread blocks. In some embodiments, thread blocks are organized into a 2D grid. For example, for an input set of $_n$ path objects the 16×16 2D thread blocks can be organized into an (n/16)×(n/16) 2D grid. Each thread in the 2D grid of thread blocks can orient itself through its block and thread indices using a parallel computing platform API such as Nvidia CUDA™. For example, in CUDA™, the block and thread indices are defined as follows:

$b_x$=blockIdx.x, $b_y$=blockIdx.y $t_x$=threadIdx.x, $t_y$=threadIdx.y

With the above defined grid of thread blocks, each thread can compute the θ in the result matrix 802 at row $b_y$*16+$t_y$ and column $b_x$*16+$t_x$.

When using a 2D n×n output grid for n path objects, each pair is represented twice in the output grid. For example, as shown in FIG. 8, an output based on a comparison between path object $P_0$ and $P_1$ is represented once in the upper triangle 812 of output grid 810 (at column $P_1$ and row $P_0$) and once in the lower triangle 814 of output grid 810 (at column $P_0$ and row $P_1$). Having two threads process, such a similarity comparison would be redundant. Accordingly, entries in one of the two triangles (e.g., 812 or 814) can instead be used to compare one path object to a reflection of another path object. This is useful when identifying affine variants since reflection is a common transform used by graphic designers and since a reflected object is an affine variant of a non-reflected object. In some embodiments, a lower triangle of an output grid is used to compute the angle of rotation between a first path object and a reflected second path object. For example, for output grid 810 in FIG. 8, the upper triangle 812 is used to compute the angle of rotation θ between $P_i$ and $P_{\{(i+1), \ldots, (n-1)\}}$ and the lower triangle 814 is used to compute the angle of rotation between reflected $P_{\{(i+1), \ldots, (n-1)\}}$ and $P_i$. Accordingly, for each pair of path objects being evaluated, similarity will either be indicated in the upper triangle 812 (i.e., without reflection) or in the lower triangle 813 (i.e., with reflection), but not both. This is indicated in the following example code that can be used for calculating the rotation matrix:

J=(by*16+ty);

I=(bx*16+tx);

// using equation (3)
// in represents 1D array of input paths
// m represents the quantity of points in each input path Xi=in[J*m+0];

Yi=in[J*m+1];

Wi=in[I*m+0];

Zi=in[I*m+1];

Yi=(I<J)?-1*Yi:Yi;/*handle reflection*/

Numerator=Wi*Yi-Zi*Xi;

Denominator=Wi*Xi+Zi*Yi;

Theta=atan2(Numerator,Denominator);

/*create rotation matrix using Theta*/

Next, each thread will iterate over all points in the respective path objects to determine a measure of difference in shape between each pair of path objects. In some embodiments, this measure of difference in shape is based on a cumulative error or Procrustes distance that can be determined using, for example, equation (4). For example, FIG. 8 also shows an input grid 840 in which the geometry data associated with the points in the input set of path objects are aligned to produce the values in the output grid 810. In some embodiments, each of the n/16 thread blocks in output grid 810 use two submatrices (e.g., 16×16 submatrices) to cache the input points from global GPU memory into shared memory of thread block. Each thread loads its aligned elements into its two respective submatrices. For example, as shown in FIG. 8, a thread associated with position 816 in the output grid 810 will load the anchor point data (x,y) corresponding to the pair of path object for position 816 into the appropriate positions 852 and 862 in the two submatrices 850 and 860 (respectively).

Once all of the threads are synchronized, all of the threads calculate and accumulate their respective measures of difference in shape between pairs of path objects (e.g., Procrustes distance). Again, the threads will iterate over all points in the respective path object to determine a cumulative measure of difference in shape between respective pairs of path objects. As shown in FIG. 8, submatrices 850 and 860 are for a first of three iterations. This one iteration will result in a partial measure of difference in shape between a pair of path objects (i.e., based on less than all the points in each path object). The quantity of iterations will not always be three as indicated in FIG. 8. Instead, the quantity of iterations may depend on the quantity of points in the respective path objects. In some embodiments, the number of iterations may be the number of points in the respective path objects divided by the number of columns in the submatrices. In the example illustrated in FIG. 8, the number of points is 9 and the number of columns in the submatrix is 3 so the number of iterations is 3. Once an iteration is complete, the threads are resynchronized before proceeding to a next iteration and a next pair of submatrices. In some embodiments, data can be stored in transposed form in one of the two submatrices to reduce the quantity of bank conflicts in the shared memory access (e.g., by a factor of 16) thereby dramatically speeding up processing time.

The similarity comparison operation proceeds through all iterations to determine a cumulative measure of difference in shape between each pair of path objects. As mentioned, the cumulative measure of difference in shape between a pair of path objects may be a cumulative Procrustes distance that can be determined using, for example, equation (4).

A pair of path objects can be identified as affine variants of each other if the measure of difference in shape between a pair of path objects satisfies some specified similarity criterion. For example, in some embodiments, the similarity criterion is based on a threshold value for the measure of difference in shape. In other words, the similarity criterion is satisfied when the determined measure of difference in shape between a pair of path objects is at or below the specified threshold. In the case of Procrustes distance, two path objects can be identified as affine variants of each other if the resulting cumulative Procrustes distance is at or below a threshold value.

In some embodiments, each entry in the output grid 810 may be indicative of whether a particular pair of path objects is affine as well as the rotation angle θ between pairs of affine path objects. For example, in some embodiments, each entry in the output grid 810 may either be the determined rotation angle θ (if the pair of path objects are affine) or some common placeholder value (if the pair of path objects are not affine) that would not be an expected value for θ. In an example embodiment, this common placeholder value may be set to a value that is 2π or greater. This is indicated in the following example code that can be used for calculating the cumulative Procrustes distance for each pair of 2D path objects and generating an output grid based on the calculations:

```
// m represents the quantity of points in each input path object
/*y and x represent the address offset for their corresponding input path
objects*/
y = by*16*m;
x = bx*16*m;
end = y + m;
error = 0.0;
/*As before*/
J = (by*16 + ty);
I = (bx*16 + tx);
for(;y < end; y+=32, x+=32) //each point contains x and y, (block size * 2)
{
    /*Xs and Ys represent two __shared__ sub matrices */
    Ys[ty][2*tx] = in[y + ty*m + 2*tx];
    Ys[ty][2*tx + 1] = in[y + ty*m + 2*tx + 1];
    Xs[tx][2*ty] = in[x + ty*m + 2*tx];
    Xs[tx][2*ty +1] = in[x + ty*m + 2*tx + 1];
    /*note the transpose of Xs*/
    __syncthreads( );
    for(int k=0; k < 16; k++)
    {
        /*get point of path 1*/
        float A0 = Ys[ty][2*k];
        float A1 = Ys[ty][2*k+1];
        A1 = (I < J) ? -1 * A1 : A1; /*handle reflection*/
        /*Apply calculated rotation to get path 2*/
        float B_0 = (A0*rotation[0] + A1*rotation[1]);
        float B_1 = (A0*rotation[2] + A1*rotation[3]);
/*Restore scaling and translation using their corresponding value*/
        B_0 = (B_0/scale[I]) + centroid[2*I+0];
        B_1 = (B_1/scale[I]) + centroid[2*I+1];
/*Compute partial Procrustes distance, with original path 2 points (B0,
        B1)*/error += sqrt((B0 - B_0)*(B0 - B_0) + (B1 - B_1)*(B1 -
        B_1));
    }
}
/*out represents n square output grid*/
/*specify error threshold*/
/*insert 2*pi if cumulative error exceeds error threshold*/
out[J*n + I] = (error > errorThreshold) ? 2 * 3.14: Theta;
```

4.4 Post-Processing

Figure 9:
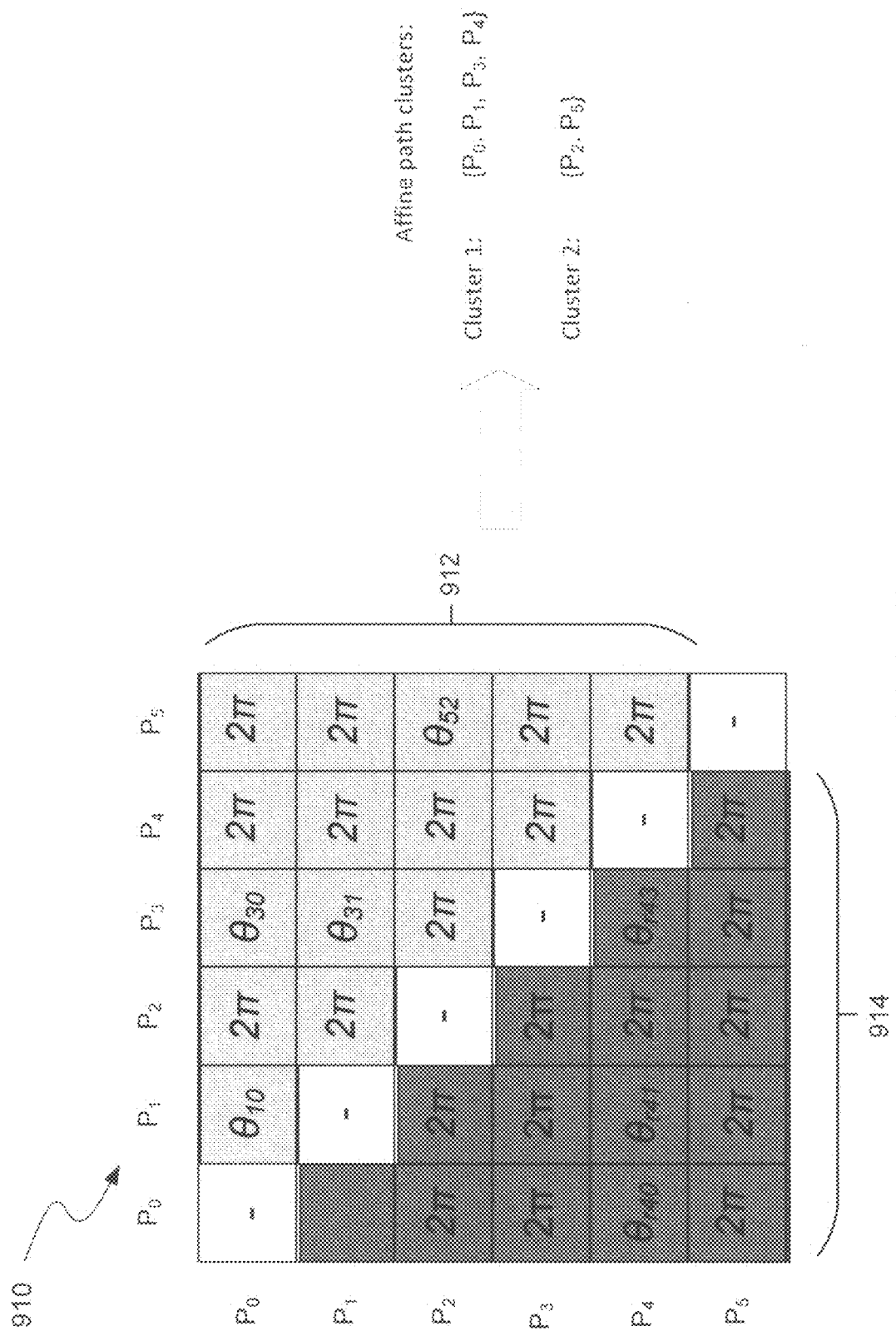
FIG. 9 shows an example 2D output grid with entries based on the similarity computation result.

In the previous operation, multiple path objects in an input set were normalized by determining translation and scale components with respect to a centroid of each path object and by determining a rotation component between pairs of path objects. Further, cumulative measures of the difference in shape between pairs of normalized path objects were determined, for example, by calculating a cumulative Procrustes distance between each pair of normalized path objects. As a result, an output grid (e.g., similar to output grid 810) is generated. FIG. 9 shows an example output grid 910 (e.g., similar to output grid 810) based on a similarity comparison between path objects $P_0$ through $P_5$. Note, the output grid 910 is shown in a simplified form for illustrative clarity. An actual output grid based on a real-world vector graphics illustration may include hundreds or thousands of entries. Further, the output grid 910 depicted in FIG. 9 may represent one of multiple output grids generated for a given vector graphics artwork where each output grid is specific to one of multiple buckets of path objects.

As shown in FIG. 9, each entry in the output grid 910 is either a rotation angle θ or a common placeholder value (e.g., 2π). Entries with the common placeholder value (i.e., 2π) indicate that the corresponding pair of path objects are not affine variants of each other, while entries with a rotation angle θ indicate that the corresponding pair of path objects are affine variants of each other and rotation component θ of affine transformation between the pair of path objects.

In a post-processing operation, the introduced technique clusters all similar paths (affine variants), for example, by processing the one or more output grids generated in the previous operation. In this example, paths objects are considered similar (i.e., affine variants of each other) if their respective rotation component is not equal to the common placeholder value (e.g., 2π). Notably, some sets of more that two path objects may be affine variants of each other and can therefore be clustered accordingly. For example, the results of output grid 910 indicate two clusters of affine variants. Specifically, cluster 1 includes path objects {$P_0$, $P_1$, $P_3$, and $P_4$} while cluster 2 includes path objects {$P_2$ and $P_5$}. As in output grid 810, output grid 910 includes an upper triangle 912 and a lower triangle 914 based on reflected path objects. For example, the entry at column $P_0$ row $P_4$ indicates that path objects $P_0$ is similar to reflected path object $P_4$. Further, the clusters 1 and 2 are based on the fact that indicated similarities between path objects $P_0$, $P_1$, $P_3$ and $P_4$ overlap with each other, but do not overlap indicated similarities between path objects $P_2$ and $P_5$. In other words, all the path objects in cluster 1 are affine variants of each other but are not affine variants of the path objects in cluster 2.

In some embodiments, path objects in a given cluster of affine variants can be represented based on the geometry of one of the other path objects in the cluster. In such embodiments, one of the path objects in a cluster may be designated as a base path object. In some embodiments, the designated base path object may be the lowest indexed path object in a cluster. For example, path object $P_0$ can be designated as the base path object for cluster 1. The other path objects in that cluster can then be represented based on the base geometry of the base path by computing the translation and scaling components with respect to that base path object. In other words, the set of path objects in a cluster of affine variants can be represented using a base geometry and one or more affine transformation matrices. For example, the similar path objects $P_1$, $P_3$, and $P_4$ in cluster 1 may be represented by a base geometry (i.e., of path object $P_0$) and one or more affine transformation matrices that can be used to produce visual outputs that are the same as path objects $P_1$, $P_3$, and $P_4$ without requiring the geometry data for path objects $P_1$, $P_3$, and $P_4$. This representation leads to significant improvement in working performance and rendering as well as a reduction in file size (as explained in subsequent section). Furthermore, transferring upstream and downstream data asynchronously with computation may yield additional performance improvements.

5. Example Applications

The introduced technique for identifying and clustering affine variants of graphics objects can be applied in various different ways to improve a computer graphics system. The following is a non-exhaustive list of some example applications of the introduced technique:

Rendering Performance: Resolution independent rendering of vector objects requires a tessellation step (or triangulation of the Bézier bounded geometry) which can then be uploaded to a GPU and processed via shaders. The introduced technique identifies and clusters the input geometry data into sets of affine variant paths along with associated transformation matrices. This allows a computer system performing the rendering to tessellate only the base geometry in each cluster and leverage instance-based rendering functionality provided by a GPU by using the associated transformation matrix for each path object in the cluster. This drastically improves rendering performance and provides better interactivity across the board.

Compact representation: The introduced technique establishes correspondence based on affine-variance. This correspondence can be used to optimize serialization of path geometry where the base geometry is serialized and only the associated transformation matrix is stored for each variant. This leads to a significant reduction in the size of the file needed to define a set of affine path objects. This reduction in file size can be particularly beneficial in cloud-based workflows where that typically require low latency.

6. Example Processes

FIGS. 10-16 show various flow diagrams that describe example processes associated with the introduced technique for identifying affine variants of graphics objects. One or more operations of the example processes of FIGS. 10-16 may be performed by any one or more computer systems associated with a graphics platform such as the graphics platform 202 described with respect to FIG. 2. In some embodiments, one or more operations of the example processes of FIGS. 10-16 may be performed by a computer system as described with respect to FIG. 23. For example, the processes described with respect to FIGS. 10-16 may be represented in instructions stored in memory that are then executed by a processing unit such as a CPU or GPU. The processes described with respect to FIGS. 10-16 are examples provided for illustrative purposes and are not to be construed as limiting. Other processes may include more or fewer operations than depicted while remaining within the scope of the present disclosure. Further, the operations associated with the example processes may be performed in a different order than is shown in the flow diagrams of FIGS. 10-16.

Figure 10:
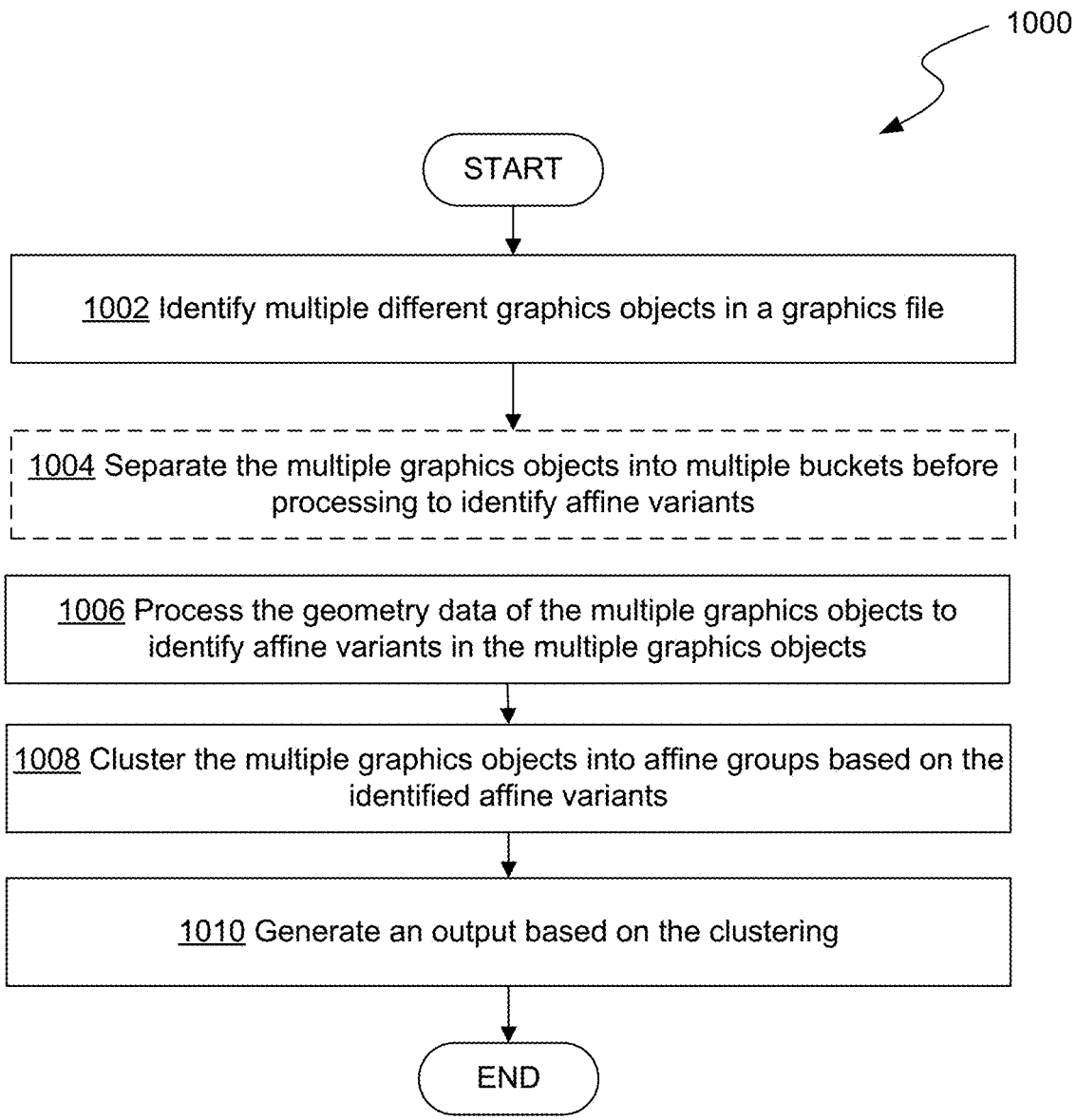
FIG. 10 shows a flow diagram of an example process for identifying and clustering graphical objects according to an embodiment of the introduced technique.

FIG. 10 shows a flow diagram of an example process 1000 for identifying and clustering graphical objects according to an embodiment of the introduced technique. In some embodiments, the graphics file is a vector graphics file (e.g., an Adobe Illustrator™ .ai file) and the multiple graphics objects are path objects. In some embodiments, one or more of the path objects are represented using cubic Bézier splines.

In some embodiments, operation 1002 may include accessing the graphics file from a local or remote storage device and reading the graphics file to identify the multiple graphics objects. In some embodiments, reading the graphics file to identify the multiple graphics objects may include extracting geometry data (e.g., point matrices) associated with the multiple graphics objects that are defined in the graphics file.

In some embodiments, example process 1000 optionally continues at operation 1004 with performing bucketization to separate the multiple graphics objects into multiple mutually exclusive buckets, for example, as described in Section 4.1 of this disclosure. An example process associated with bucketization is described with respect to FIG. 11.

Example process 1000 continues at operation 1006 with processing the geometry data associated with the multiple graphics objects to identify affine variants in the multiple graphics objects, for example, as described in Section 4.3 of this disclosure. An example process for identifying affine variants is described with respect to FIG. 12.

Depending on whether a bucketization operation was performed, operation 1006 may be performed once on an entire input set of graphics objects or may be performed on each of the multiple mutually exclusive buckets. In either case, in some embodiments operation 1006 may be performed using a GPU of a computer system associated with a graphics platform 202. In some embodiments, operation 1006 may be performed at least in part using a CPU, for example, when the quantity of graphics objects is below a threshold. An example process for determining whether to process geometry data using a GPU or a CPU is described with respect to FIG. 13.

Example process 1000 continues at operation 1008 with clustering the multiple graphics objects into one or more affine groups based on the identified affine variants, for example, as described in Section 4.4 of this disclosure. Operation 1008 results in one or more mutually exclusive affine groups that each include graphics objects that are affine variants of each other. In other words, the graphics objects in a particular affine group are affine variants of each other but are not affine variants with any of the graphics objects in other affine groups. An example process for clustering graphics objects into affine groups is described with respect to FIG. 14.

Example process 1000 concludes at operation 1010 with generating an output based on the clustering performed at operation 1008. In some embodiments, the output generated at operation 1010 may include an updated or new version of the graphics file that includes simplified geometry data based on the affine clusters. In some embodiments, the output generated at operation 1010 may include a rendering of a graphic artwork based on the graphics file. In some embodiments, the output may include a displayed indication to a user of one or more of the affine variants. Some example processes for generating an output are described with respect to FIGS. 15 and 16.

In some embodiments, one or more of the operations of example process 1000 may be performed in real-time or near-real-time (i.e., within milliseconds) as a user is editing the graphics file, viewing a rendering based on the graphics file, etc. In some embodiments, one or more of the operations of example process 1000 may be performed in a batch mode on multiple stored graphics files. In some embodiments, one or more of the operation of example process 1000 may be performed fully in the background on the graphics file without requiring any explicit user input or other interaction.

Figure 11:
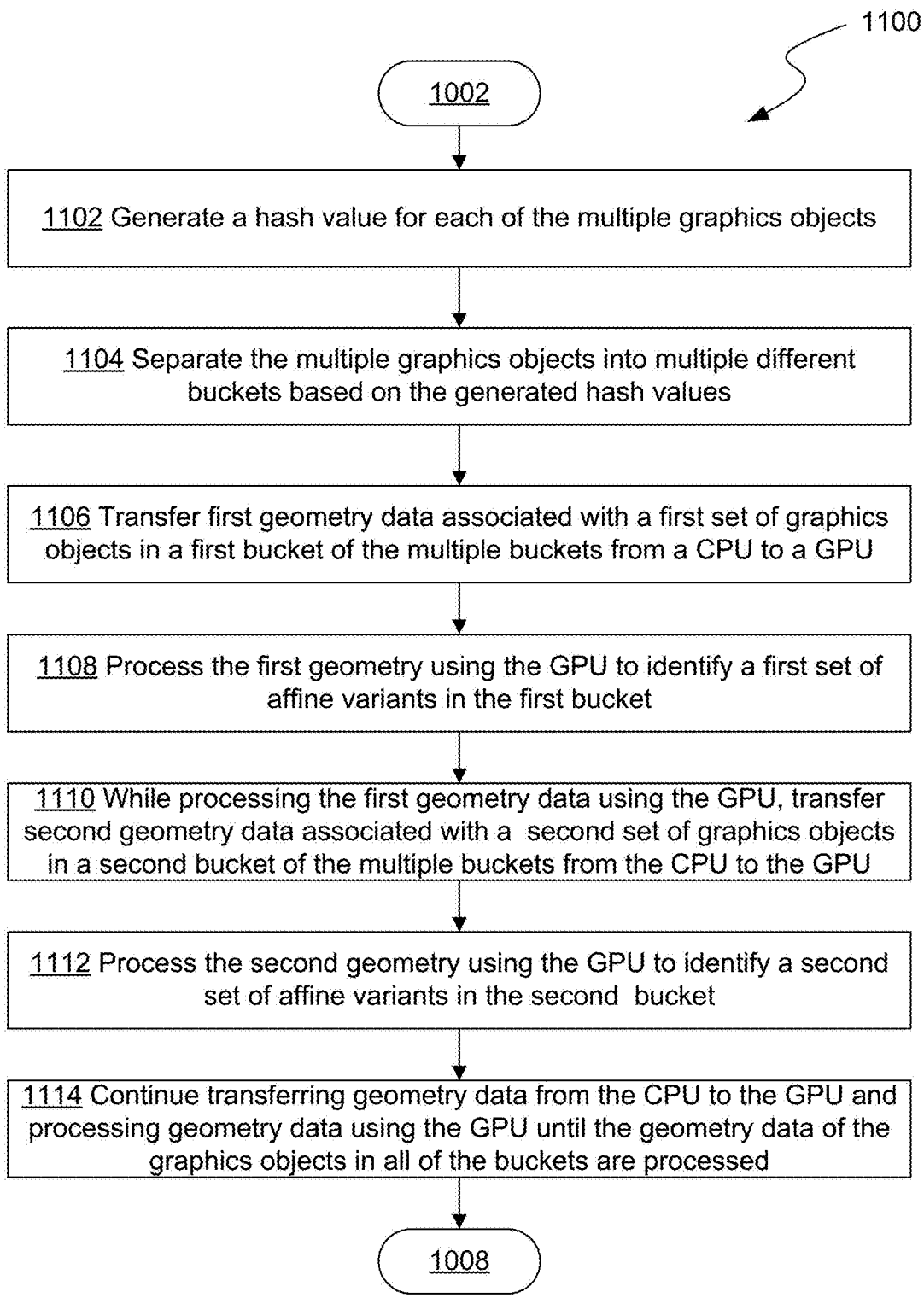
FIG. 11 shows a flow diagram of an example process for performing bucketization before processing graphics objects to identify affine variants.

FIG. 11 shows a flow diagram of an example process 1100 for performing bucketization before processing graphics objects to identify affine variants. In some embodiments, example process 1100 may represent a subprocess of operations 1004 and/or 1006 of example process 1000.

Example process 1100 begins at operation 1102 with generating a hash value for each of the multiple graphics objects. In some embodiments, the hash value for each graphics object is generated based on a quantity of primitives of a particular type (e.g., Line, Curve, etc.) of primitive that are present in the graphics object. In some embodiments, the hash value may further be generated based on a quantity of occurrences of certain patterns or relationships between primitives of a particular type. For example, the hash value for a particular graphics object may be based on how many times a line is adjacent to a curve in the particular graphics object.

Example process 1100 continues at operation 1104 with separating the multiple graphics objects into multiple mutually exclusive buckets based on their respective hash values. In some embodiments, each bucket includes only graphics objects with the same hash values. In other words, the quantity of resulting buckets will equal the quantity of unique hash values resulting from operation 1102. In some embodiments, the graphics objects may be separated into the multiple buckets by applying a clustering algorithm to the set of hash values resulting from operation 1102. The type clustering algorithm applied may differ in various embodiments. Examples of clustering algorithms include centroid-based clustering algorithms (e.g., k-means), distribution-based clustering algorithms (e.g., Gaussian distribution), and density-based clustering algorithms (e.g., DBSCAN). Depending on the type of clustering technique applied, operation 1104 may result in a fixed quantity of buckets of potentially varying size, may result in a varying quantity of buckets of fixed size, or may result in a varying quantity of buckets of varying size.

In some embodiments, operations 1102 and 1104 of example process 1110 may represent subprocesses of operation 1004 in example process 1000. Accordingly, operations 1102 and 1104 may be performed before processing any of the geometry data of the multiple buckets to identify affine variants.

With the multiple buckets created at operation 1104, example process continues with processing the geometry data associated with the multiple graphics objects to identify affine variants. Since the buckets are mutually exclusive and based on an initial similarity comparison (based on hash values) there is no expectation that a first graphics object in a first bucket will be an affine variant of a second graphics object in a second bucket. Accordingly, the operations to identify affine variants can be performed based on similarity comparisons between objects within buckets instead of across the entire input set of graphics objects. In other words, in some embodiments, operation 1004 in example process 1000 may include processing first geometry data associated with a first subset of the multiple graphics objects in a first bucket to identify a first set of affine variants and processing second geometry data associated with a second subset of the multiple graphics objects in a second bucket to identify a second set of affine variants.

In some embodiments, processing the geometry data associated with the multiple graphics objects to identify affine variants may include loading the geometry data associated from a CPU to a GPU for processing. The disjoint nature of the multiple buckets created at operation 1104 enables the transferring and processing of different buckets to overlap.

Accordingly, in some embodiments, example process 1100 continues at operation 1106 with transferring first geometry data associated with a first subset of the multiple graphics objects in a first bucket from a CPU of a computer system to a graphical GPU of the computer system.

Example process 1100 then continues at operation 1108 with processing the first geometry data to identify a first set of affine variants in the first subset of the multiple graphics objects using the GPU.

Example process 1100 then continues at operation 1110 with transferring second geometry data associated with a second subset of the multiple graphics objects in a second bucket from the CPU to the GPU while processing the first geometry data using the GPU. In other words, operations 1108 and 1110 may overlap, at least in part.

Example process 1100 continues at operation 1112 with processing the second geometry data to identify a second set of affine variants in the second subset of the multiple graphics objects using the GPU.

Example process 1100 continues at operation 1114 with continuing to transfer geometry data from the CPU to the GPU and processing the geometry data using the CPU in an overlapping manner (e.g., as described with respect to operations 1108-1112) until the geometry data of the graphics objects in all of the buckets are processed and all affine variants are identified.

Figure 12:
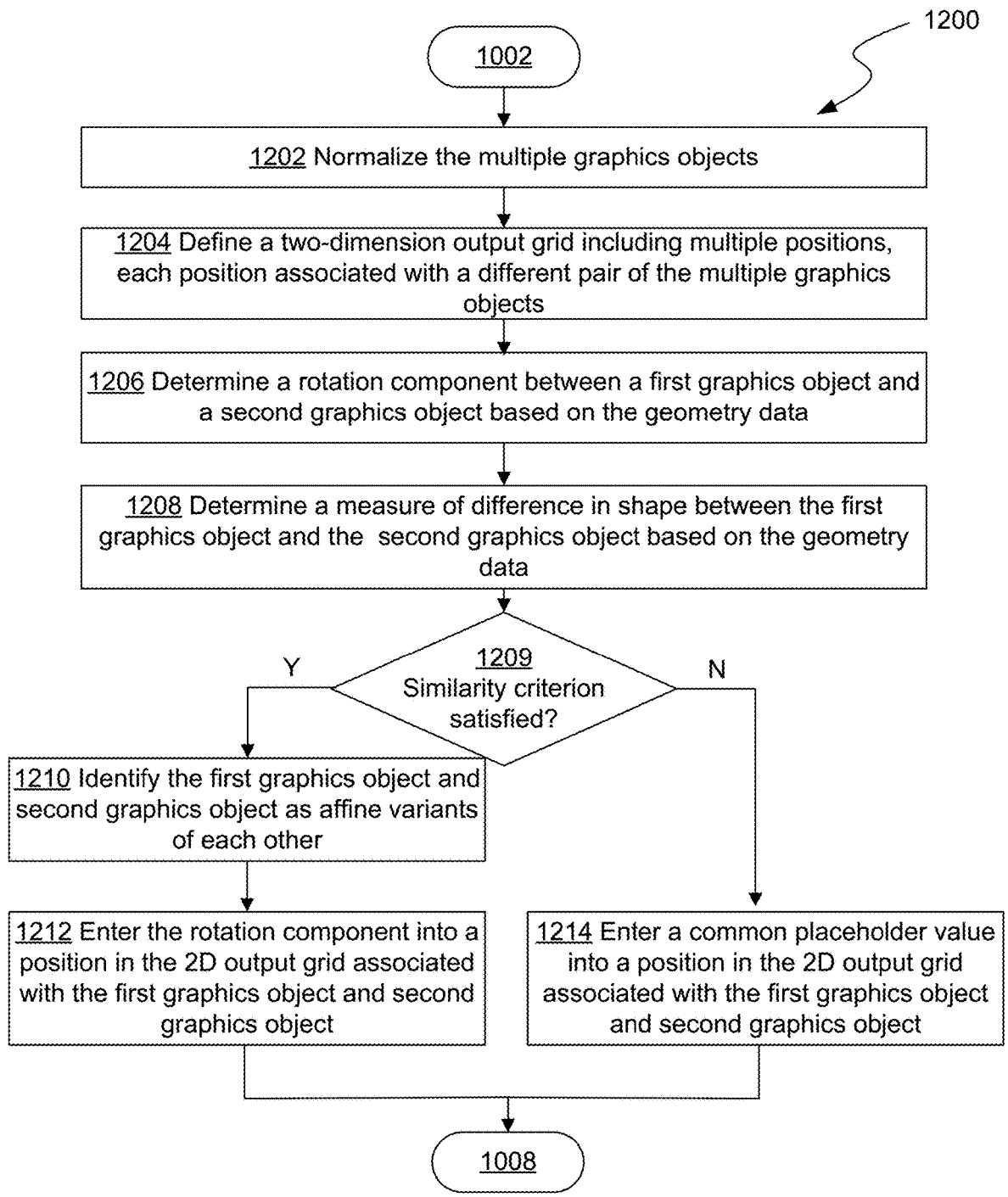
FIG. 12 shows a flow diagram of an example process for processing graphics objects to identify affine variants.

FIG. 12 shows a flow diagram of an example process 1200 for processing graphics objects to identify affine variants. In some embodiments, example process 1200 may represent a subprocess of operation 1006 of example process 1000.

Example process 1200 begins at operation 1202 with normalizing the multiple graphics objects identified at operation 1002 in example process 1200. In some embodiments, normalizing the multiple graphics objects may include processing the geometry data to determine a translation component and scale component for each of the multiple graphics objects, for example, as described in Sections 4.3.1 and 4.3.2 in this disclosure. For example, in some embodiments, operation 1202 may include translating the points of each of the multiple graphics objects so that their respective means are at a common reference point (i.e., an origin). In some embodiments, operation 1202 may further include scaling each of the multiple graphics objects so that the root mean square distance from their respective points to the common reference point is a common value (e.g., 1).

Example process 1200 continues with defining a 2D output grid that includes multiple positions where each position is associated with a different pair of the multiple graphics objects. An example 2D output grid 810 is depicted in FIG. 8.

Example process 1200 continues at operation 1206 with determining a rotation component between each of the pairs of graphics objects, for example, as described with respect to Section 4.3.3 in this disclosure. For example, as shown in FIG. 12, for a particular pair of graphics objects, operation 1206 may include determining a rotation component between a first graphics object and a second graphics object based on their respective geometry data. In some embodiments, operation 1206 may first include selecting one of the two graphics objects in a given pair as a reference object. In some embodiments, the selected reference object is the lowest indexed graphics object in the pair.

In some embodiments, the rotation component determined at operation 1206 is an optimal rotation angle that can be determined using a Procrustes analysis (e.g., using equation (2)). In some embodiments the optimal rotation angle that can be determined using an optimized Procrustes analysis based on a single point in each graphics object (e.g., using equation (3)).

Example process 1200 continues at operation 1208 with determining a measure of difference in shape between each of the pairs of graphics objects. For example, as shown in FIG. 12, for a particular pair of graphics objects, operation 1208 may include determining a measure of difference in shape between the first graphics object and the second graphics object based on their respective geometry data. In some embodiments, the measure of difference in shape between the first graphics object and the second graphics object is a cumulative Procrustes distance based on a comparative analysis of multiple points in each of the pair of graphics objects. For example, in some embodiments, operation 1208 may include iterating over all of the multiple points in the first graphics object and second graphics object to determine multiple partial Procrustes distances and then determining a cumulative Procrustes distance based on the multiple partial Procrustes distances (e.g., using equation (4)).

Example process 1200 continues at decision block 1209 with determining whether the measures of difference in shape between each of the pairs of graphics objects satisfy a specified similarity criterion. For example, as shown in FIG. 12, for a particular pair of graphics objects, operation 1209 may include determining whether the measure of difference in shape between the first graphics object and the second graphics object satisfies the specified similarity criterion.

In some embodiments the similarity criterion is based on a specified threshold value for the measure determined at operation 1208. For example, in some embodiments, the similarity criterion is satisfied in response to determining that the measure of difference in shape determined at operation 1208 is below a specified threshold value. In some embodiments, the similarity criterion may be user-specified to affect whether certain objects are identified as affine variants of each other. For example, a user may lower the threshold value for the similarity criterion to reduce false positive identifications of affine variants. Conversely, the user may increase the threshold value for the similarity criterion to further reduce the geometry complexity in a graphic artwork thereby further reducing file size and/or rendering time. In some embodiments, the threshold value of the similarity criterion may remain static. Alternatively, in some embodiments, the threshold value of the similarity criterion may dynamically change based on results, for example, by applying machine learning techniques.

In response to determining that the similarity criterion is satisfied, example process continues at operation 1210 with identifying the given pair of graphics objects as affine variants of each other. For example, as shown in FIG. 12, for a particular pair of graphics objects, operation 1210 may include identifying the first graphics object and the second graphics object as affine variants of each other.

Example process 1200 then continues at operation 1212 with entering the rotation component for the particular pair of affine graphics objects into a position in the 2D output grid that is associated with the particular pair of graphics objects, for example, as described with respect to FIG. 8. As shown in FIG. 12, for a particular pair of graphics objects, operation 1212 may include entering the rotation component between the first graphics object and the second graphics object (i.e., as determined at operation 1206) into a position in the 2D output grid that is associated with the first graphics object and the second graphics object.

Alternatively, in response to determining that the similarity criterion is satisfied, the pair of graphics objects are not identified as affine variants of each other an example process instead proceeds at operation 1214 with entering a common placeholder value into the 2D grid at the position corresponding to the pair of graphics objects. For example, for a particular pair of graphics objects, operation 1214 may include entering the common placeholder value into the position in the 2D output grid that is associated with the first graphics object and the second graphics object. In some embodiments the common placeholder value is $2\pi$ or greater since such a value would not make sense as a rotation component.

As previously discussed, in some embodiments a programmable GPU pipeline is used to process the geometry data of the multiple graphics objects to identify affine variants. In such embodiments, a separate GPU thread is used to perform the similarity comparisons between each different pair of graphics objects. Accordingly, in some embodiments, example process 1200 may include initiating multiple GPU threads and causing each of the multiple GPU threads to perform any one or more of operations 1206-1214 on a different pair of graphics objects. In other words, different instances of operations 1206-1214 may be performed in parallel by different GPU threads.

Figure 13:
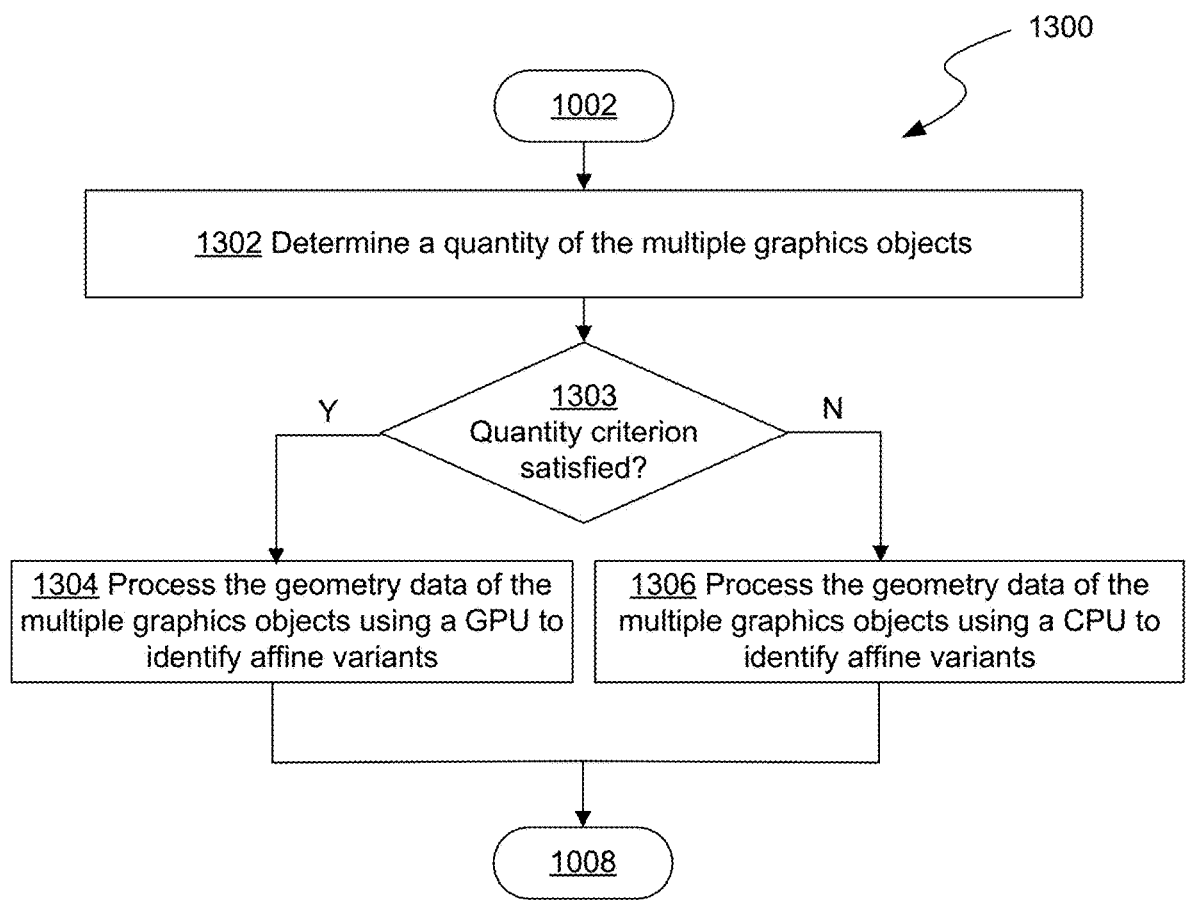
FIG. 13 shows a flow diagram of an example process for determining whether to process geometry data using a graphics processing unit (GPU) or a central processing unit (CPU)

In some situations, geometry data can be processed in the CPU instead of the GPU. FIG. 13 shows a flow diagram of an example process 1300 for determining whether to process geometry data using a GPU or a CPU. In some embodiments, example process 1300 may be a subprocess of operation 1006 in example process 1000.

Example process 1300 begins at operation 1302 with determining a quantity of graphics objects identified, for example, at operation 1002 in process 1000. If bucketization is applied, operation 1302 may include determining a quantity of graphics objects in a particular bucket.

Example process 1300 continues decision 1303 with determining whether the quantity determined at operation 1302 satisfies a quantity criterion. In some embodiments, the quantity criterion is based on a specified threshold value for the quantity determined at operation 1302. For example, in some embodiments, the quantity criterion is satisfied in response to determining that the quantity determined at operation 1302 is at or above a threshold value. Conversely, the quantity criterion is not satisfied in response to determining that the quantity determined at operation 1302 below the threshold value. In an example embodiment, the threshold value associated with the quantity criterion is based on a size a thread block implemented at the GPU (e.g., 16).

In response to determining that the quantity criterion is satisfied, example process 1300 proceeds to operation 1304 with processing the geometry data using a GPU to identify affine variants.

Conversely, in response to determining that the quantity criterion is not satisfied, example process 1300 proceeds to operation 1306 with processing the geometry data using a CPU to identify affine variants.

Figure 14:
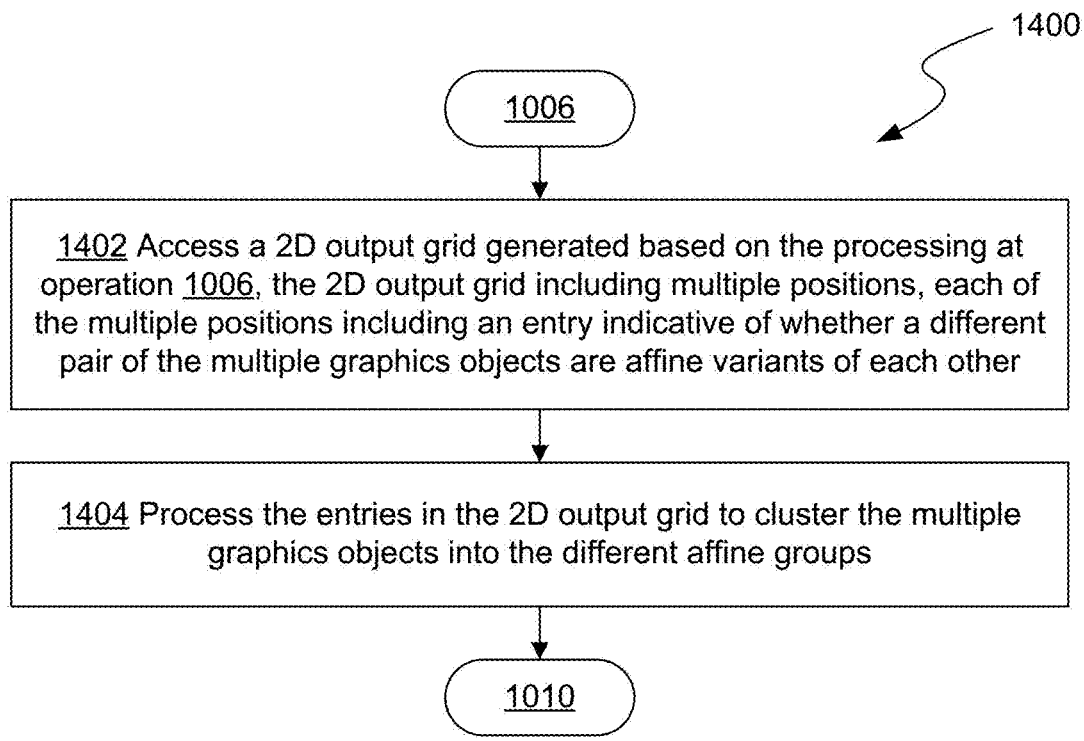
FIG. 14 shows a flow diagram of an example process for clustering multiple graphics objects into affine groups.

FIG. 14 shows a flow diagram of an example process 1400 for clustering the multiple graphics objects into multiple affine groups. In some embodiments, example process 1400 may be a sub process of operation 1008 in example process 1000.

Example process 1400 begins at operation 1402 with accessing a 2D output grid that was generated, for example, based on the processing of operation 1006 in example process 1006. An example 2D output grid with entries is shown in FIG. 9.

Example process 1400 continues at operation 1404 with processing the entries in the 2D output grid (i.e., data indicative of affine variance between pairs of graphics objects) to cluster the multiple graphics objects into multiple different affine groups. For example, in some embodiments, operation 1404 may include identifying, based on the processing, a first cluster including a first plurality of graphics objects that are affine variants of each other and a second cluster including a second plurality of graphics objects that are affine variants of each other, where the first cluster and second cluster are mutually exclusive.

Figure 15:
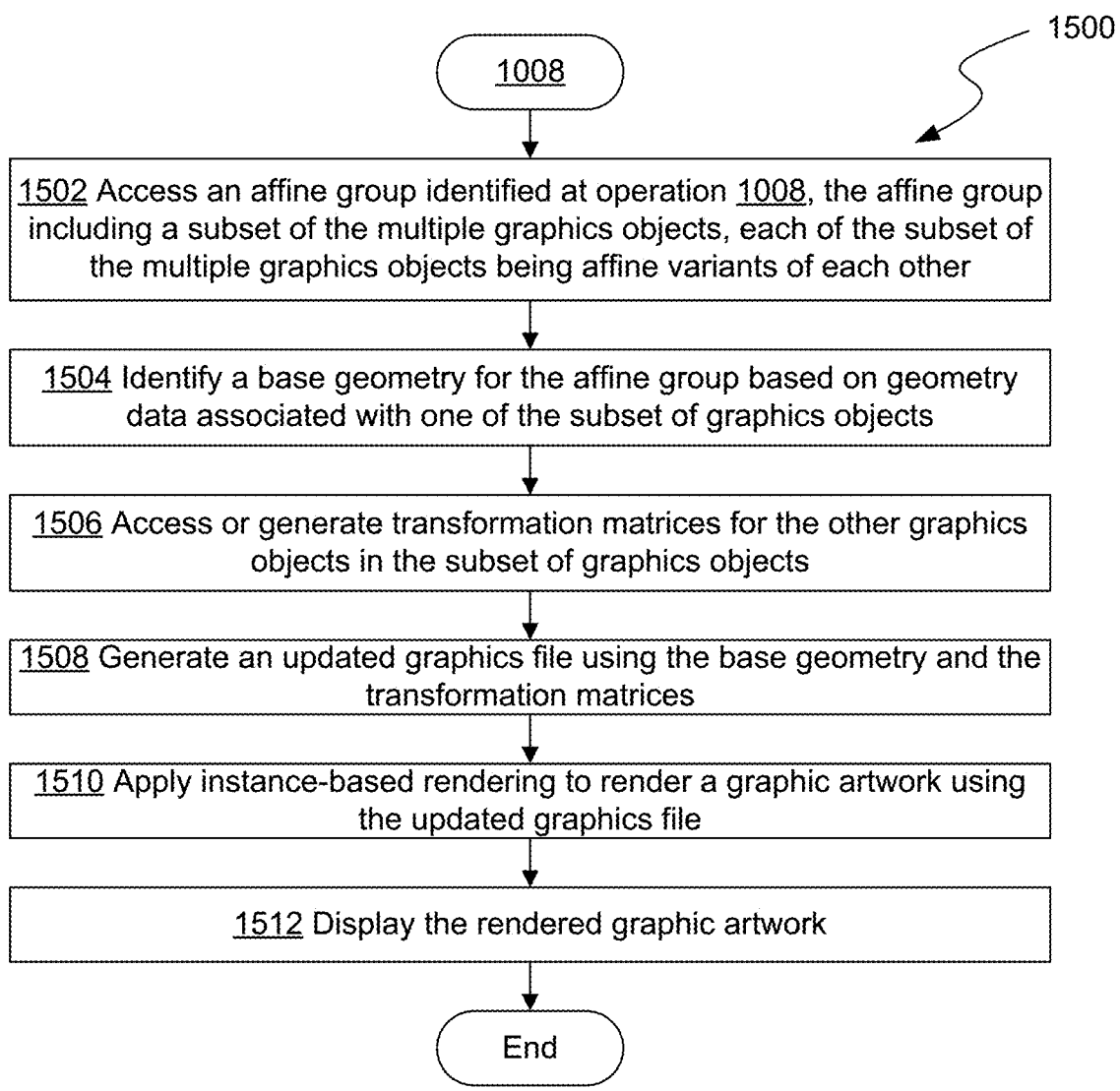
FIG. 15 shows a flow diagram of an example process for generating an output based on identified affine variants.

FIG. 15 shows a flow diagram of an example process 1500 for generating an output based on identified affine variants in a graphics file. In some embodiments, the example process 1500 may represent a subprocess of operation 1010 in example process 1000.

Example process 1500 begins at operation 1502 with accessing an affine group of graphics objects, for example, that were identified based on the clustering operation 1008 of example process 1000. In other words, the affine group of graphics objects may include a subset of the input set of multiple graphics objects that are affine variants of each other.

In some embodiments, information indicative of one or more affine groups is stored in memory or other data storage where it is then accessible to a computer system executing process 1500.

Example process 1500 continues at operation 1504 with identifying a base geometry for the affine group. In some embodiments, the base geometry for the affine group is based on the geometry data associated with one of the subset of graphics objects in the affine group. In some embodiments, the base geometry for the affine group is based on the geometry data associated with the lowest indexed graphics object in the affine group.

Example process 1500 continues at operation 1506 with accessing or generating one or more transformation matrices for the other graphics objects in the affine group. For example, the transformation matrices may be based on any one or more of the translation, scale, and/or rotation components described with respect to Sections 4.3.1, 4.3.2, or 4.3.3.

Example process 1500 continues at operation 1508 with generating an updated graphics file using the base geometry and the one or more transformation matrices. As previously discussed, representing an affine group of graphics objects using a base geometry and transformation matrices can significantly lower overall geometric complexity and reduce the file size of a graphics file. In some embodiments, the generated "output" of operation 1010 in process 1000 may include this updated graphics with redefined geometry data.

Example process 1500 continues at operation 1510 with applying instance-based rendering to render a graphic artwork using the updated graphics file. For example, in some embodiments, rendering a graphics file may include a tessellation operation based on the geometry data of the each of the graphics objects in a graphics file. The results of the tessellation are uploaded to the GPU and processed using shaders to produce the rendering. In such embodiments, operation 1510 may include performing the tessellation operation only on the base geometry of a particular affine group and then leveraging instance-based rendering provided by the GPU to render the other graphics objects using their associated transformation matrices. In some embodiments the generated "output" of operation 1010 in process 1000 may include this rendering of the graphic artwork.

Example process 1500 concludes at operation 1512 with displaying the rendered graphic artwork, for example, via a display device of a user computer. In some embodiments, the rendered graphic artwork is displayed via an interface 204 associated with a graphics platform 202. In some embodiments the generated "output" of operation 1010 in process 1000 may include this display of the rendered graphic artwork.

Figure 16:
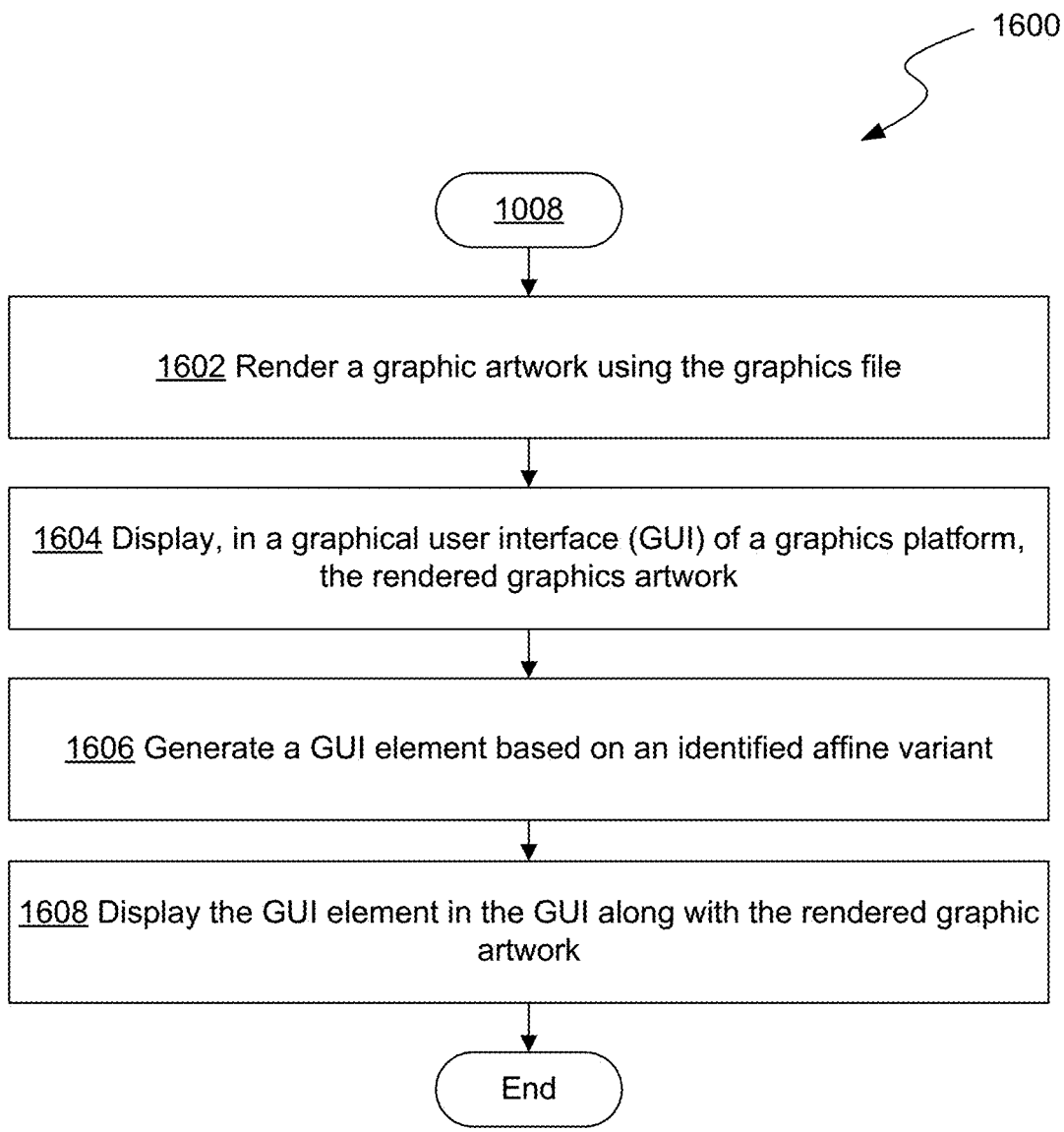
FIG. 16 shows a flow diagram of another example process for generating an output based on identified affine variants.

FIG. 16 shows a flow diagram of another example process 1600 for generating an output based on identified affine variants in a graphics file. In some embodiments, the example process 1600 may represent a subprocess of operation 1010 in example process 1000.

Example process 1600 begins at operation 1602 with rendering a graphic artwork using a graphics file and at operation 1604 with displaying the rendered graphic artwork in a GUI of a graphics platform (e.g., interface 204 of graphics platform 202).

Example process 1600 continues at operation 1606 with generating a GUI element based on an affine variant and/or affine group and at operation 1608 with displaying the GUI element in the GUI of the graphics platform along with the rendered graphic artwork.

In some embodiments, the GUI element generated at operation 1606 may include a graphical overlay that is indicative of an affine variant and/or affine group that was identified, for example, at operations 1006-1008 in example process 1000. For example, the graphical overlay may be displayed in the GUI over the rendering of the graphic artwork to highlight multiple instances of graphics objects depicted in the graphic artwork that are affine variants of each other. In some embodiments, the GUI element may be displayed in response to a user interaction with the displayed graphic artwork. For example, in response to a user selecting a particular object depicted in the graphic artwork, one or more graphical overlays may be generated and displayed over the graphic artwork at locations corresponding to instance of affine variants of the particular object.

In some embodiments, the GUI element generated at operation 1606 may include an interactive element. For example, the interactive element may be displayed over the graphic artwork at a location corresponding to a particular graphics object and may enable the user to edit the particular graphics object. In response to detecting a user interaction with the interactive element, the particular graphics object may be edited along with any affine variants of the particular object.

7. Example Results

FIGS. 17-22 show a series of results of applying an embodiment of the introduced technique to various real-world Adobe Illustrator™ files. The described runtimes are computed using a computer system with a 2.6 GHz Intel Core i7™ CPU and an AMD Radeon Pro™ 560X 4 GB GPU. The depicted results are provided for illustrative purposes and are not intended to be representative of results in all situations. Each of FIGS. 17-22 depict an input vector graphic geometry in a left column and an output optimized vector geometry resulting from processing according to the introduced technique in a right column. Further, each column includes a screen capture of two versions of the respective vector geometry, an appearance version in an upper row and an outline version in a lower row. The outline versions are intended to illustrate the underlying geometric complexity of a given artwork before and after processing according to the introduced technique. Notably, the outputs (on the right side) do not depict path objects that are affine variants of other path objects present in a given artwork. In other words, the only path objects depicted in the output (on the right side) are unique (i.e., non-affine) path objects. This is for illustrative purposes to show the reduction in geometric complexity of the artwork achieved using the introduced technique but does not depict what a user would actually see. Since affine variants may be rendered using instance-based rendering using base geometry and transformation matrices, the fully rendered artwork would appear no different to a user before and after processing according to the introduced technique.

Figure 17:
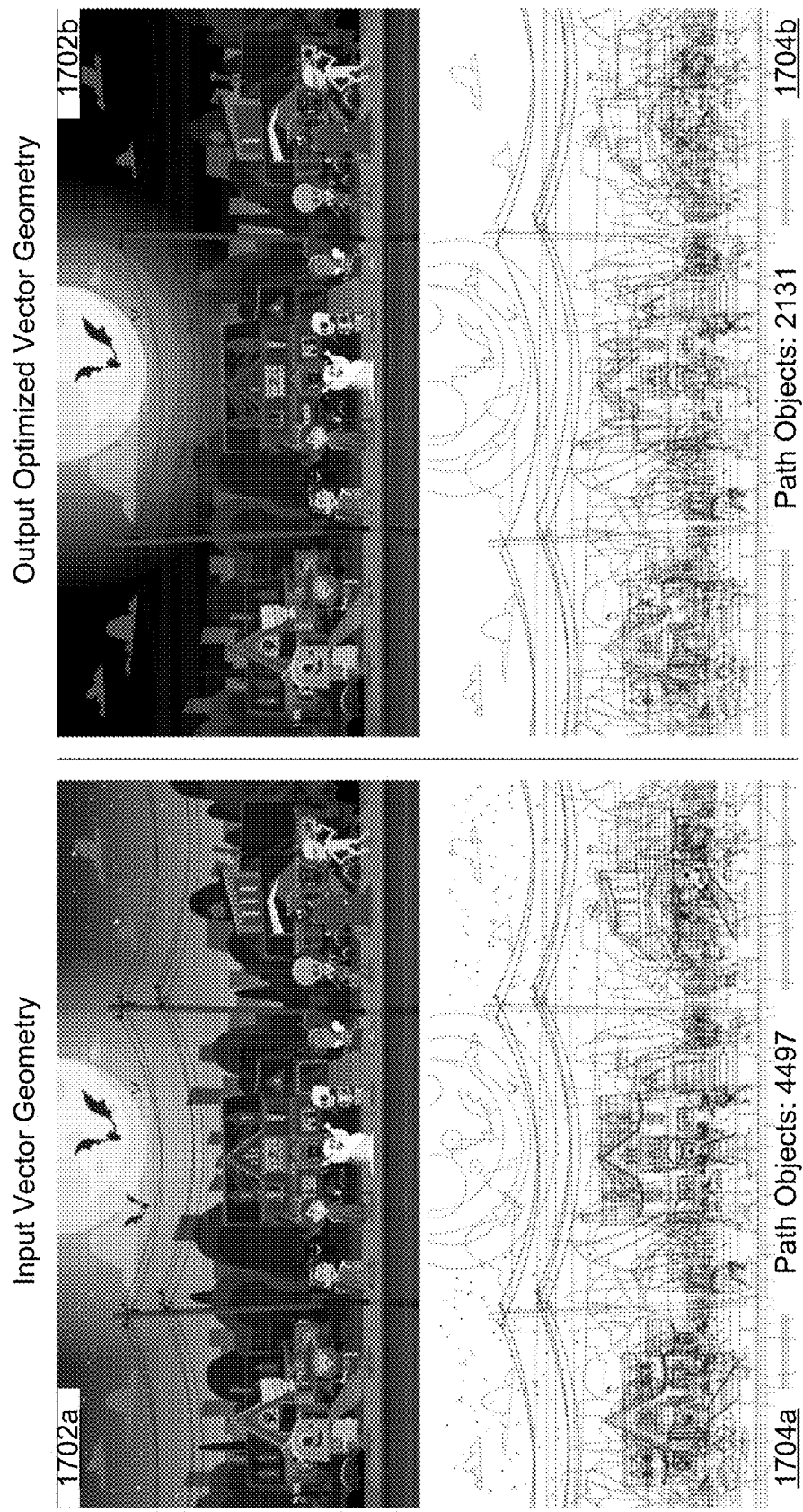
FIGS. 17-22 show a series of results of applying an embodiment of the introduced technique to various vector graphics files.

FIG. 17 shows a screen capture 1702a of a first input vector graphic artwork and a screen capture 1704a of an outline version of the first input vector graphic artwork depicted in screen capture 1702a. FIG. 17 also shows a screen capture 1702b of an output based on an application of the introduced technique to the first input vector graphic artwork and screen capture 1704b shows an outline version of the output depicted in screen capture 1702b. As shown in FIG. 17, application of the introduced technique to the first input vector graphic artwork reduced the quantity of path objects from 4497 to 2131 (a 52.6% reduction). Further, the runtime to perform this optimization on the first input vector graphic artwork according to the introduced technique was 115 milliseconds.

Figure 18:
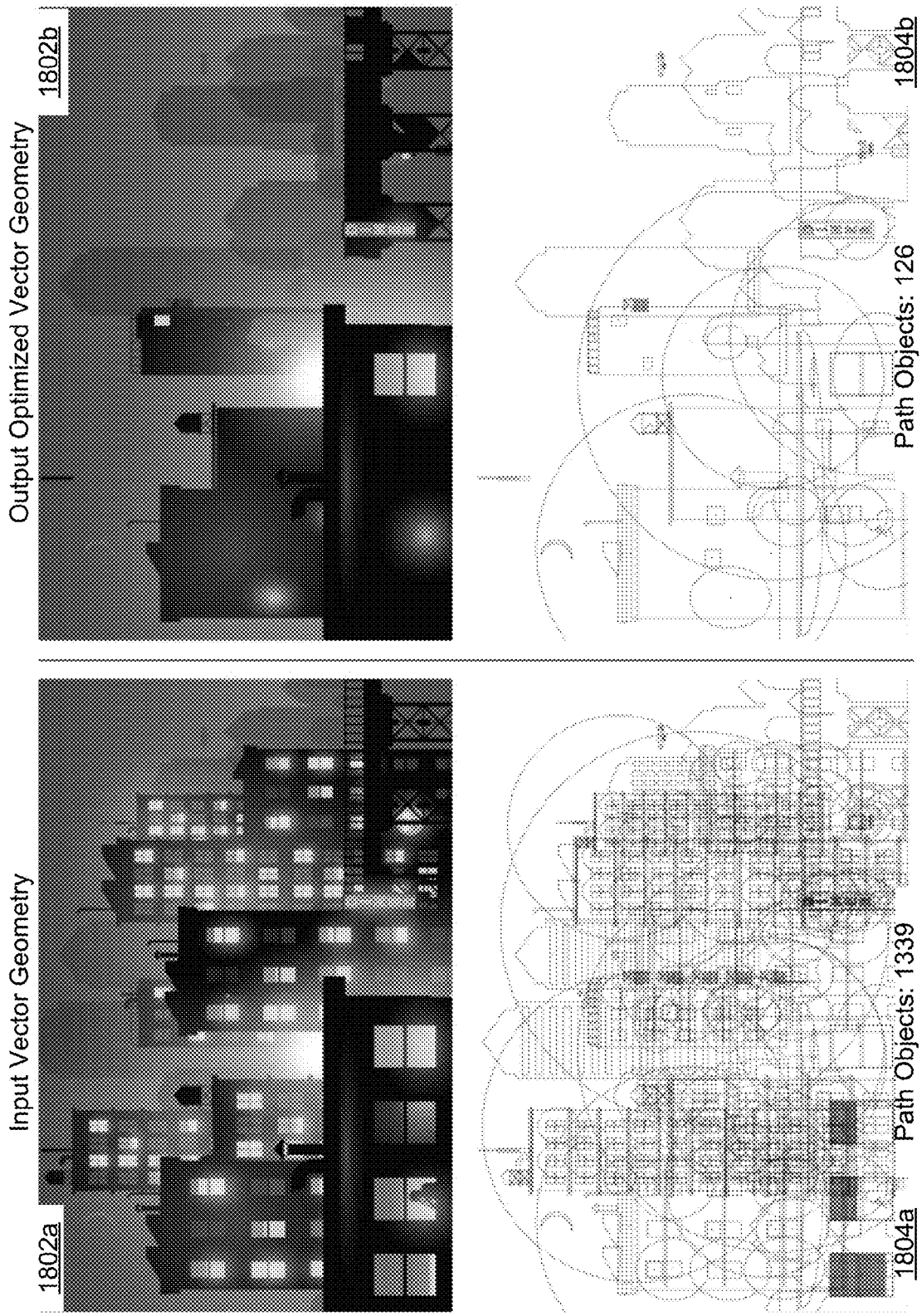

FIG. 18 shows a screen capture 1802a of a second input vector graphic artwork and a screen capture 1804a of an outline version of the second input vector graphic artwork depicted in screen capture 1802a. FIG. 18 also shows a screen capture 1802b of an output based on an application of the introduced technique to the second input vector graphic artwork and screen capture 1804b shows an outline version of the output depicted in screen capture 1802b. As shown in FIG. 18, application of the introduced technique to the second input vector graphic artwork reduced the quantity of path objects from 1339 to 126 (a 90.5% reduction). Further, the runtime to perform this optimization on the second input vector graphic artwork according to the introduced technique was 27 milliseconds.

Figure 19:
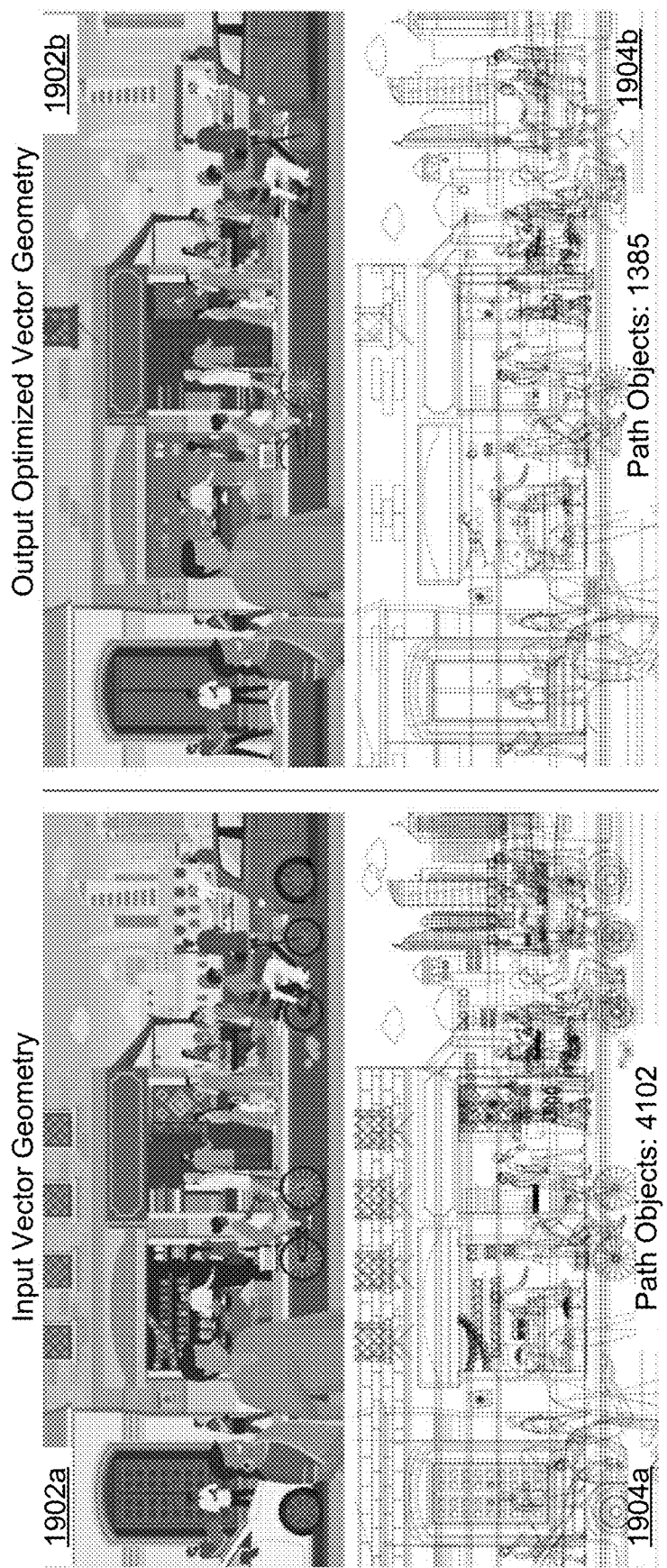

FIG. 19 shows a screen capture 1902a of a third input vector graphic artwork and a screen capture 1904a of an outline version of the third input vector graphic artwork depicted in screen capture 1902a. FIG. 19 also shows a screen capture 1902b of an output based on an application of the introduced technique to the third input vector graphic artwork and screen capture 1904b shows an outline version of the output depicted in screen capture 1902b. As shown in FIG. 19, application of the introduced technique to the third input vector graphic artwork reduced the quantity of path objects from 4102 to 1385 (a 66.2% reduction). Further, the runtime to perform this optimization on the third input vector graphic artwork according to the introduced technique was 97 milliseconds.

Figure 20:
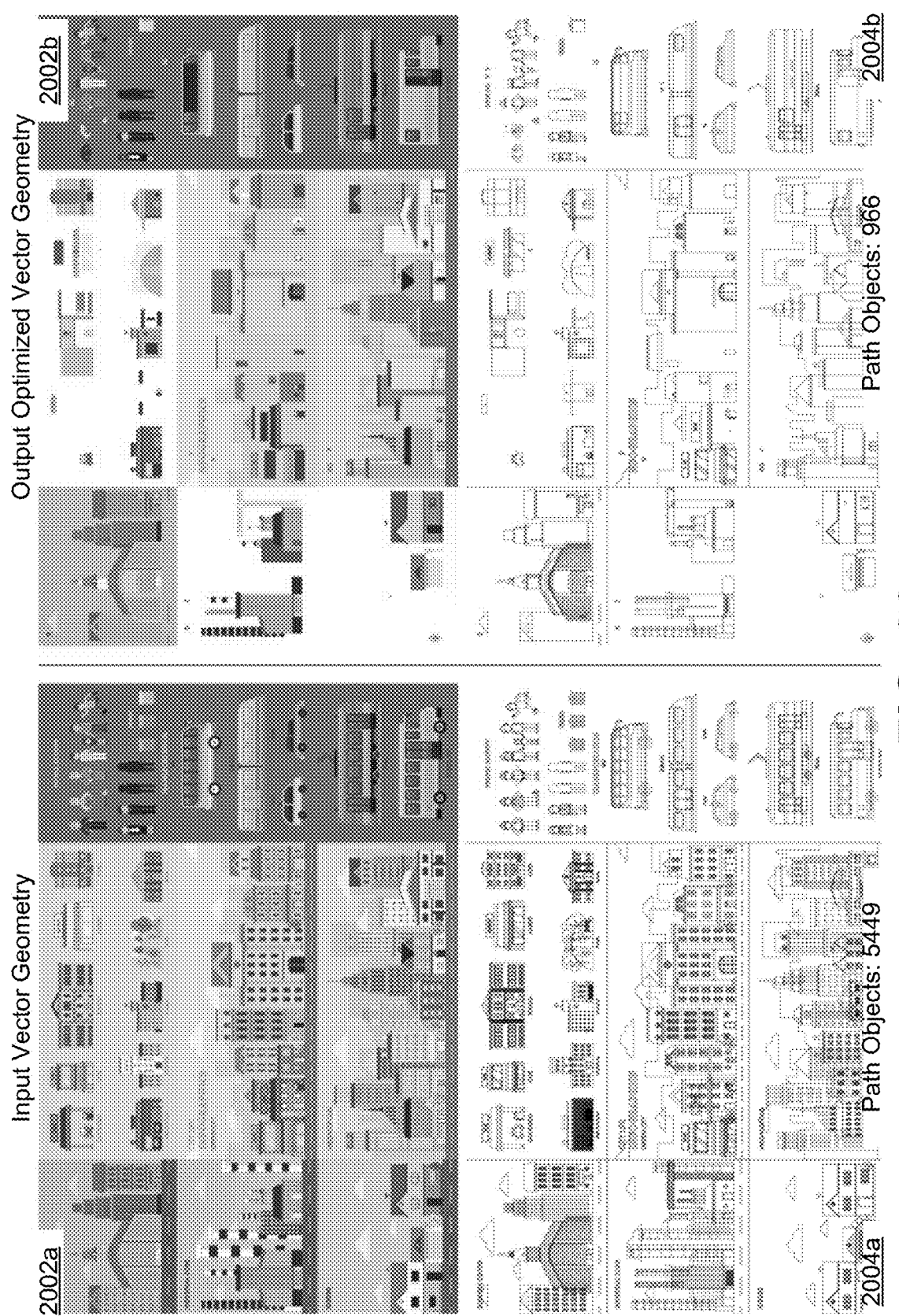

FIG. 20 shows a screen capture 2002a of a fourth input vector graphic artwork and a screen capture 2004a of an outline version of the fourth input vector graphic artwork depicted in screen capture 2002a. FIG. 20 also shows a screen capture 2002b of an output based on an application of the introduced technique to the fourth input vector graphic artwork and screen capture 2004b shows an outline version of the output depicted in screen capture 2002b. As shown in FIG. 20, application of the introduced technique to the fourth input vector graphic artwork reduced the quantity of path objects from 5449 to 966 (an 82.2% reduction). Further, the runtime to perform this optimization on the fourth input vector graphic artwork according to the introduced technique was 182 milliseconds.

Figure 21:
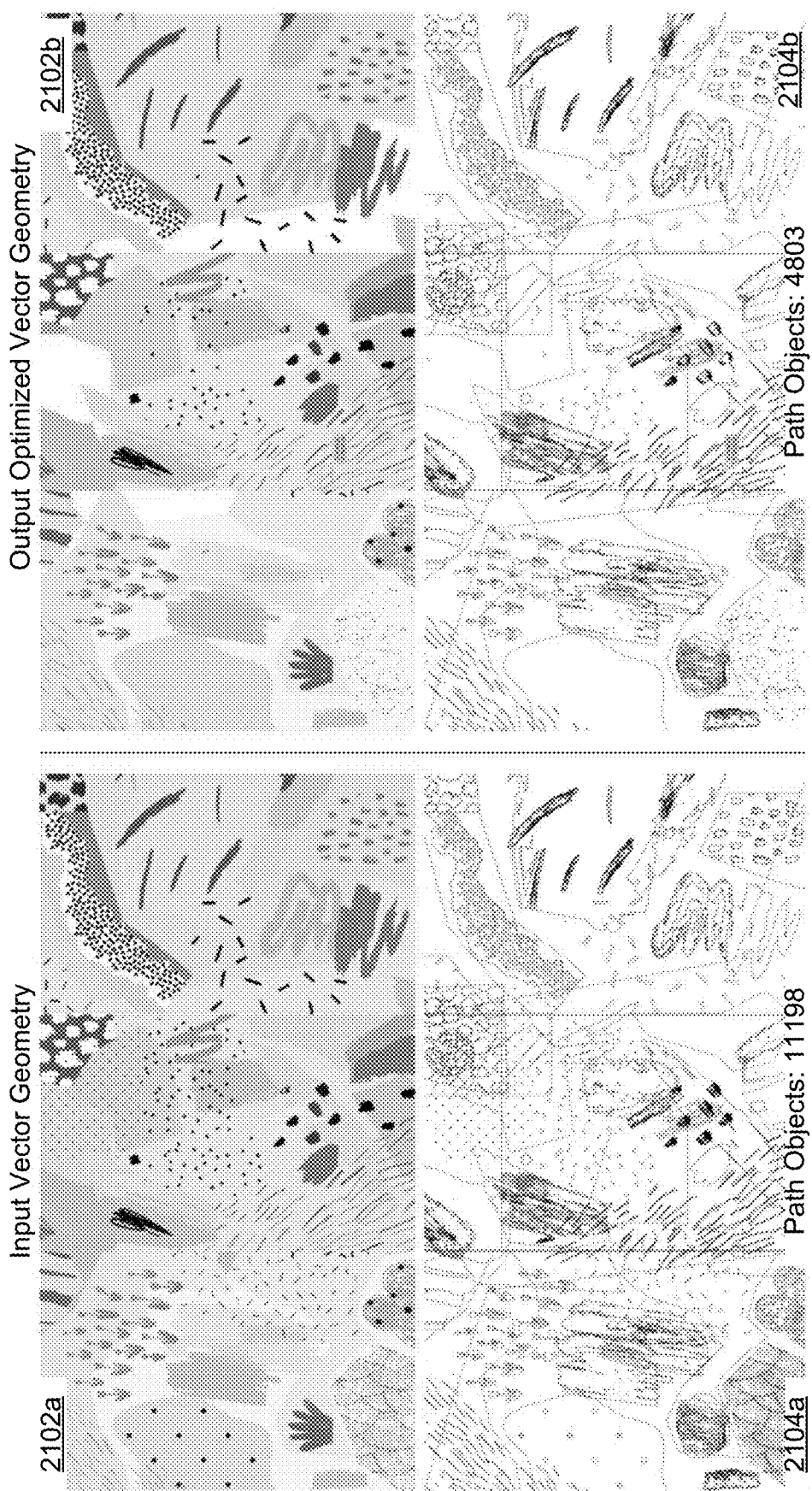

FIG. 21 shows a screen capture 2102a of a fifth input vector graphic artwork and a screen capture 2104a of an outline version of the fifth input vector graphic artwork depicted in screen capture 2102a. FIG. 21 also shows a screen capture 2102b of an output based on an application of the introduced technique to the fifth input vector graphic artwork and screen capture 2104b shows an outline version of the output depicted in screen capture 2102b. As shown in FIG. 21, application of the introduced technique to the fifth input vector graphic artwork reduced the quantity of path objects from 11198 to 4803 (a 57% reduction). Further, the runtime to perform this optimization on the fifth input vector graphic artwork according to the introduced technique was 270 milliseconds.

Figure 22:
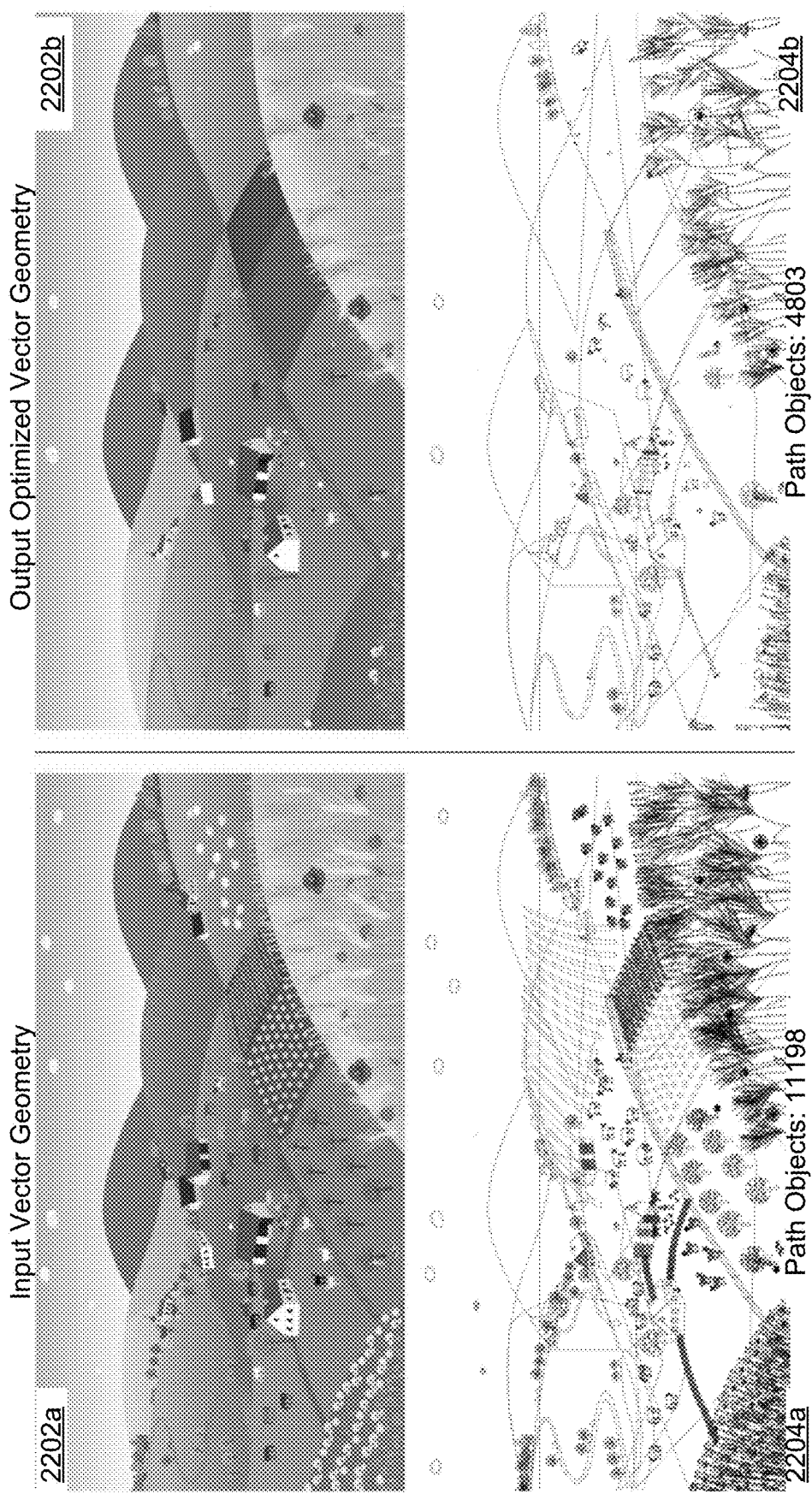

FIG. 22 shows a screen capture 2202a of a sixth input vector graphic artwork and a screen capture 2204a of an outline version of the sixth input vector graphic artwork depicted in screen capture 2202a. FIG. 22 also shows a screen capture 2202b of an output based on an application of the introduced technique to the sixth input vector graphic artwork and screen capture 2204b shows an outline version of the output depicted in screen capture 2202b. As shown in FIG. 22, application of the introduced technique to the sixth input vector graphic artwork reduced the quantity of path objects from 14829 to 114 (a 92.4% reduction). Further, the runtime to perform this optimization on the sixth input vector graphic artwork according to the introduced technique was 300 milliseconds.

8. Example Computer System

Figure 23:
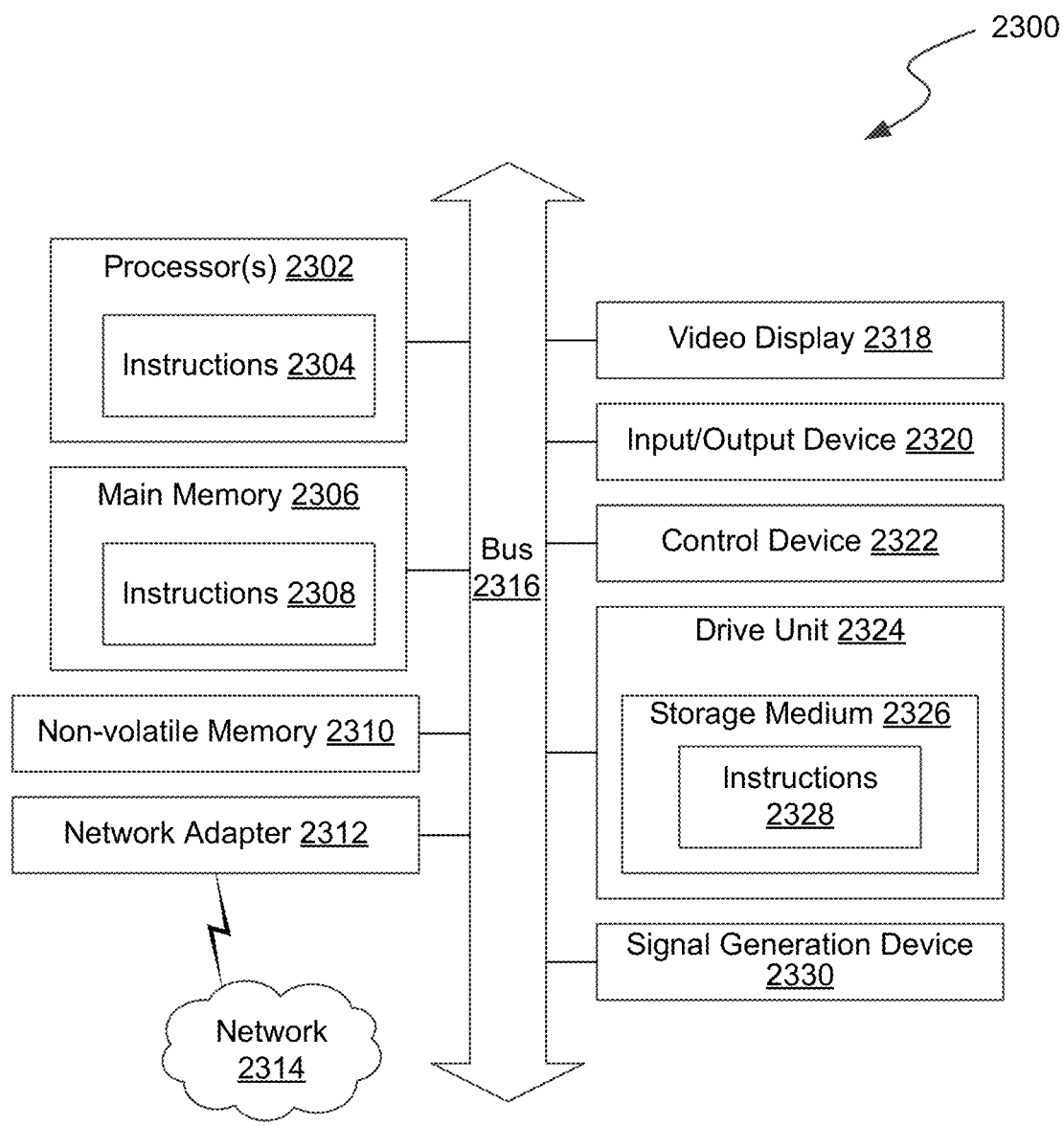
FIG. 23 shows a block diagram of an example computer system in which at least some operations associated with an embodiment of the introduced technique can be performed.

FIG. 23 is a block diagram illustrating an example of a computer system 2300 in which at least some operations described herein can be implemented. For example, some components of the computer system 2300 may be part of a computer system associated with the graphics platform 202.

The computer system 2300 may include one or more processing units or ("processors") 2302, main memory 2306, non-volatile memory 2310, network adapter 2312 (e.g., network interface), video display 2318, input/output devices 2320, control device 2322 (e.g., keyboard and pointing devices), drive unit 2324 including a storage medium 2326, and signal generation device 2330 that are communicatively connected to a bus 2316. The bus 2316 is illustrated as an abstraction that represents one or more physical buses and/or point-to-point connections that are connected by appropriate bridges, adapters, or controllers. The bus 2316, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computer system 2300 may share a similar computer processor architecture as that of a server computer, a desktop computer, a tablet computer, personal digital assistant (PDA), mobile phone, a wearable electronic device (e.g., a watch or fitness tracker), network-connected ("smart") device (e.g., a television or home assistant device), virtual/augmented reality systems (e.g., a head-mounted display), or any other electronic device capable of executing a set of instructions (sequential or otherwise) that specify action(s) to be taken by the computer system 2300.

The one or more processors 2302 may include CPUs, GPUs, application specific integrated circuits (ASICs), programmable logic devices (PLDs), field programmable gate arrays (FPGAs), and/or any other hardware devices for processing data.

While the main memory 2306, non-volatile memory 2310, and storage medium 2326 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 2328. The term "machine-readable medium" and "storage medium" shall also be taken to include any medium that is capable of storing, encoding, or carrying a set of instructions for execution by the computer system 2300.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions 2304, 2308, 2328) set at various times in various memory and storage devices in a computing device. When read and executed by the one or more processors 2302, the instruction(s) cause the computer system 2300 to perform operations to execute elements involving the various aspects of the disclosure.

Operation of the main memory 2306, non-volatile memory 2310, and/or storage medium 2326, such as a change in state from a binary one (1) to a binary zero (0) (or vice versa) may comprise a visually perceptible physical change or transformation. The transformation may include a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 2310, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 2312 enables the computer system 2300 to mediate data in a network 2314 with an entity that is external to the computer system 2300 through any communication protocol supported by the computer system 2300 and the external entity. The network adapter 2312 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 2312 may include a firewall that governs and/or manages permission to access/proxy data in a computer network, as well as tracks varying levels of trust between different machines and/or applications. The firewall can be any quantity of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

9. Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method comprising:
   identifying a plurality of graphics objects that are defined in a graphics file;
   generating a hash value for each of the plurality of graphics objects;
   separating the plurality of graphics objects into a plurality of buckets based on the hash values;
   processing geometry data associated with the graphics objects in each of the plurality of buckets to identify affine variants in the graphics objects in each of the plurality of buckets;
   clustering the plurality of graphics objects into one or more affine groups based on the identified affine variants;
   identifying a base geometry associated with a particular affine group of the one or more affine groups, the base geometry being the geometry of a particular graphics object in the particular affine group; and
   updating the graphics file such that the graphics objects in the particular affine group are defined using the base geometry.

2. The method of claim 1, wherein the graphics file is a vector graphics file, wherein the graphics objects are path objects, and wherein one or more of the path objects are represented using a cubic Bézier spline.

3. The method of claim 1, wherein graphics objects in a particular bucket of the plurality of buckets are associated with the same hash value, and wherein the plurality of buckets are mutually exclusive.

4. The method of claim 1, wherein the hash value for a particular graphics object of the plurality of graphics objects is generated based on a quantity of primitives of a particular type of primitive that are present in the particular graphics object.

5. The method of claim 1, wherein the plurality of buckets include a first bucket and a second bucket, and wherein processing the geometry data of the graphics objects in each of the plurality of buckets to identify affine variants includes:
   processing first geometry data associated with a first subset of the plurality of graphics objects in the first bucket to identify a first set of affine variants in the first subset of the plurality of graphics objects; and
   processing second geometry data associated with a second subset of the plurality of graphics objects in the second bucket to identify a second set of affine variants in the second subset of the plurality of graphics objects.

6. The method of claim 1, wherein the plurality of buckets include a first bucket and a second bucket, and wherein processing the geometry data of the graphics objects in each of the plurality of buckets to identify affine variants includes:
   transferring first geometry data associated with a first subset of the plurality of graphics objects in the first bucket from a central processing unit (CPU) of a computer system to a graphics processing unit (GPU) of the computer system;
   processing, using the GPU, the first geometry data to identify a first set of affine variants in the first subset of the plurality of graphics objects;
   transferring second geometry data associated with a second subset of the plurality of graphics objects in the second bucket from the CPU to the GPU while processing the first geometry data using the GPU; and
   processing, using the GPU, the second geometry data to identify a second set of affine variants in the second subset of the plurality of graphics objects.

7. The method of claim 1, wherein processing the geometry data of the graphics objects in each of the plurality of buckets to identify affine variants includes:
   for a particular bucket of the plurality of buckets:
      determining a measure of difference in shape between a first graphics object in the particular bucket and a second graphics object in the particular bucket based on the geometry data associated with the first graphics object and second graphics object;
      determining that the measure of difference in shape satisfies a specified similarity criterion; and
      identifying the first graphics object as an affine variant of the second graphics object in response to determining that the measure of difference in shape satisfies the specified similarity criterion.

8. The method of claim 7, wherein the similarity criterion is satisfied if the measure of difference in shape is below a specified threshold value.

9. The method of claim 7, wherein the measure of difference in shape is a cumulative Procrustes distance.

10. The method of claim 1, wherein processing the geometry data of the graphics objects in each of the plurality of buckets to identify affine variants includes:
    for a particular bucket of the plurality of buckets:
       determining a translation component and scale component for each graphics object in the particular bucket; and
       determining a rotation component between each different pair of graphics objects in the particular bucket.

11. The method of claim 1, wherein processing the geometry data of the graphics objects in each of the plurality of buckets to identify affine variants includes:
    for a particular bucket of the plurality of buckets:
       defining a two-dimensional (2D) output grid including a plurality of positions;
       causing each of a plurality of GPU threads to process geometry data associated with a different pair graphics objects in the particular bucket to:
          determine a measure of similarity between the pair of graphics objects;
          determine whether the pair of graphics objects are affine variants of each other based on the determined measure of similarity; and
          place an entry in a particular position of the plurality of positions in the 2D output grid, wherein the particular position is associated with the pair of graphics objects, and wherein the entry is indicative of whether the pair of graphics objects are affine variants of each other.

12. The method of claim 11,
wherein if the pair of graphics objects are affine variants of each other, the entry is an angle representative of a rotation component between the pair of graphics objects; and
wherein if the pair of graphics objects are not affine variants of each other, the entry is a common placeholder value.

13. The method of claim 11,
wherein the plurality of positions in the 2D output grid include a first position and a second position;
wherein the first position includes a first entry based on a first similarity comparison between a first object and a second graphics object;
wherein the second position includes a second entry based on a second similarity comparison between the first graphics object and a reflected version of the second graphics object; and
wherein affine variance between the first graphics object and second graphics object is indicated based on either the first entry or second entry.

14. The method of claim 11, wherein clustering the plurality of graphics objects into one or more different affine groups includes:
processing a plurality of entries in the 2D output grid;
wherein each of the plurality of entries in the 2D output grid is indicative of whether a different pair of graphics objects in the particular bucket are affine variants of each other; and
identifying, based on the processing, a first cluster including a subset of the plurality of graphics objects that are affine variants of each other and a second cluster including a second subset of the plurality of graphics objects that are affine variants of each other, wherein the first cluster and second cluster are mutually exclusive.

15. The method of claim 1, further comprising:
accessing or generating one or more transformation matrices for one or more other graphics objects in the particular affine group; and
wherein the graphics file is further updated such that the one or more other graphics objects in the affine group are defined using the base geometry and the one or more transformation matrices.

16. The method of claim 1, further comprising:
applying instance-based rendering to render a graphic artwork using the updated graphics file; and
causing display of the rendered graphic artwork.

17. The method of claim 1, further comprising:
rendering a graphic artwork using the updated graphics file;
causing display of the rendered graphic artwork in a graphical user interface (GUI) associated with a graphics platform;
generating a GUI element based on one or more of the identified affine variants; and
causing display of the GUI element in the GUI along with the rendered graphic artwork.

18. The method of claim 1, further comprising:
before processing the geometry data of the graphics objects in a particular bucket of the plurality of buckets:
determining a quantity of the graphics objects in the particular bucket;
determining that the quantity of graphics objects in the particular bucket does not satisfy a specified quantity criterion; and
processing the geometry data associated with the graphics objects in the particular bucket using a CPU instead of a GPU in response to determining that the quantity graphics objects in the particular bucket does not satisfy the specified quantity criterion.

19. A computer system comprising:
one or more processing units; and
a memory coupled to the one or more processing units, the memory having instructions stored thereon, which when executed by the one or more processing units, cause the computer system to:
identify a plurality of graphics objects that are defined in a graphics file;
generate a hash value for each of the plurality of graphics objects;
separate the plurality of graphics objects into a plurality of buckets based on the hash values;
process geometry data associated with the graphics objects in each of the plurality of buckets to identify affine variants in the graphics objects in each of the plurality of buckets;
cluster the plurality of graphics objects into one or more affine groups based on the identified affine variants;
identify a base geometry associated with a particular affine group of the one or more affine groups, the base geometry being the geometry of a particular graphics object in the particular affine group; and
update the graphics file such that the graphics objects in the particular affine group are defined using the base geometry.

20. A non-transitory computer-readable medium with instructions stored thereon that, when executed by a computer system, cause the computer system to perform operations comprising:
identifying a plurality of graphics objects that are defined in a graphics file;
generating a hash value for each of the plurality of graphics objects;
separating the plurality of graphics objects into a plurality of buckets based on the generated hash values;
processing geometry data associated with the graphics objects in each of the plurality of buckets to identify affine variants in the graphics objects in each of the plurality of buckets;
clustering the plurality of graphics objects into one or more affine groups based on the identified affine variants, wherein graphics objects in a particular affine group of the one or more affine groups are affine variants of each other; and
identifying a base geometry associated with a particular affine group of the one or more affine groups, the base geometry being the geometry of a particular graphics object in the particular affine group; and
updating the graphics file such that the graphics objects in the particular affine group are defined using the base geometry.

* * * * *